United States Patent
Sakai et al.

(10) Patent No.: US 8,676,487 B2
(45) Date of Patent: Mar. 18, 2014

(54) APPARATUS FOR PREDICTING THE MOVEMENT OF A MOBILE BODY

(75) Inventors: Katsuhiro Sakai, Hadano (JP); Kazuaki Aso, Susono (JP); Masahiro Harada, Susono (JP); Toshiki Kindo, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 62 days.

(21) Appl. No.: 13/148,507

(22) PCT Filed: Feb. 5, 2010

(86) PCT No.: PCT/IB2010/000230
§ 371 (c)(1),
(2), (4) Date: Aug. 9, 2011

(87) PCT Pub. No.: WO2010/089661
PCT Pub. Date: Aug. 12, 2010

(65) Prior Publication Data
US 2011/0313664 A1 Dec. 22, 2011

(30) Foreign Application Priority Data
Feb. 9, 2009 (JP) ................................. 2009-027262

(51) Int. Cl.
*G08G 1/16* (2006.01)

(52) U.S. Cl.
USPC ........................................ 701/301; 701/300

(58) Field of Classification Search
USPC ................................ 701/301, 300
See application file for complete search history.

(56) References Cited

U.S. PATENT DOCUMENTS

| | | | | |
|---|---|---|---|---|
| 6,085,151 A * | 7/2000 | Farmer et al. | .................. | 701/301 |
| 6,615,119 B1 * | 9/2003 | Shimizu | ....................... | 701/31.6 |
| 6,944,543 B2 * | 9/2005 | Prakah-Asante et al. | ..... | 701/301 |
| 7,532,109 B2 * | 5/2009 | Takahama et al. | ............ | 340/436 |
| 2003/0006889 A1 | 1/2003 | Koike | | |

(Continued)

FOREIGN PATENT DOCUMENTS

| | | |
|---|---|---|
| EP | 1 990 786 | 11/2008 |
| JP | 7 104062 | 4/1995 |

(Continued)

OTHER PUBLICATIONS

International Search Report issued Aug. 27, 2010 in PCT/IB10/000230 filed Feb. 5, 2010.

(Continued)

*Primary Examiner* — Mary Cheung
*Assistant Examiner* — Michael Berns
(74) *Attorney, Agent, or Firm* — Oblon, Spivak, McClelland, Maier & Neustadt, L.L.P.

(57) ABSTRACT

A movement region prediction apparatus includes a mobile body detection device that detects a mobile body around a host vehicle; a prediction device that predicts a movement region of the detected mobile body; and a degree-of-normality acquisition device that acquires degree of normality of a situation of movement of the detected mobile body. The prediction device has a plurality of movement prediction models for predicting the movement region of the mobile body, and selects a movement prediction model from the plurality of movement prediction models based on the degree of normality acquired by the degree-of-normality acquisition device, and predicts the movement region of the mobile body using the selected movement prediction model.

3 Claims, 13 Drawing Sheets

(56) References Cited

U.S. PATENT DOCUMENTS

| | | | |
|---|---|---|---|
| 2003/0009275 A1 | 1/2003 | Koike | |
| 2005/0108180 A1 | 5/2005 | Iwane | |
| 2005/0114000 A1 | 5/2005 | Cashler | |
| 2005/0195383 A1 | 9/2005 | Breed et al. | |
| 2006/0162985 A1* | 7/2006 | Tanaka et al. | 180/279 |
| 2007/0030131 A1* | 2/2007 | Takahama et al. | 340/435 |
| 2008/0084283 A1* | 4/2008 | Kalik | 340/435 |
| 2008/0097699 A1 | 4/2008 | Ono | |
| 2008/0125972 A1 | 5/2008 | Neff | |
| 2008/0172156 A1* | 7/2008 | Joh et al. | 701/45 |
| 2008/0266168 A1 | 10/2008 | Aso et al. | |
| 2008/0303696 A1 | 12/2008 | Aso et al. | |
| 2008/0306666 A1* | 12/2008 | Zeng et al. | 701/70 |
| 2009/0024357 A1* | 1/2009 | Aso et al. | 702/181 |
| 2009/0037088 A1 | 2/2009 | Taguchi | |
| 2010/0106418 A1* | 4/2010 | Kindo et al. | 701/300 |

FOREIGN PATENT DOCUMENTS

| | | |
|---|---|---|
| JP | 2003 58994 | 2/2003 |
| JP | 2004 220348 | 8/2004 |
| JP | 2006 85285 | 3/2006 |
| JP | 2007 233646 | 9/2007 |
| JP | 2007 276508 | 10/2007 |
| JP | 2008 3707 | 1/2008 |
| JP | 2008 117082 | 5/2008 |
| WO | 2008 156201 | 12/2008 |

OTHER PUBLICATIONS

Japanese Office Action issued Dec. 7, 2010 in JP 2009-027262 filed Feb. 9, 2009 (with partial English translation).

\* cited by examiner

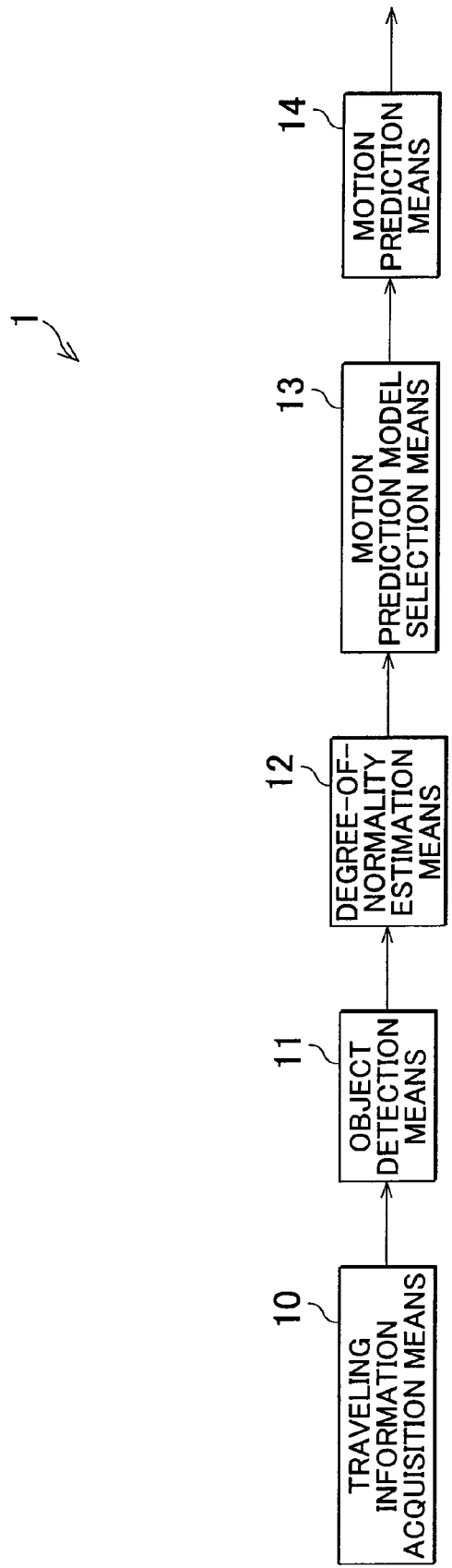

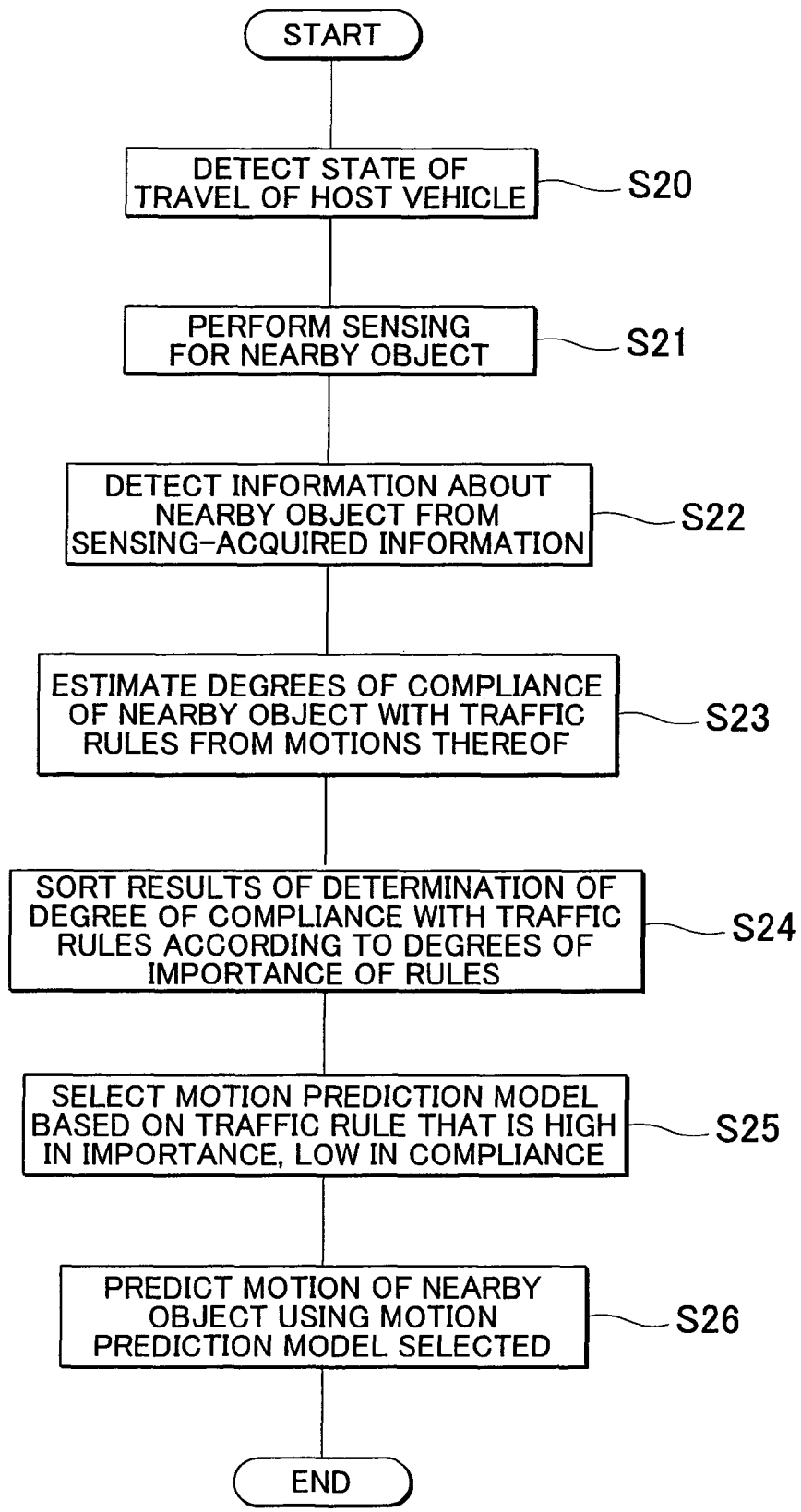

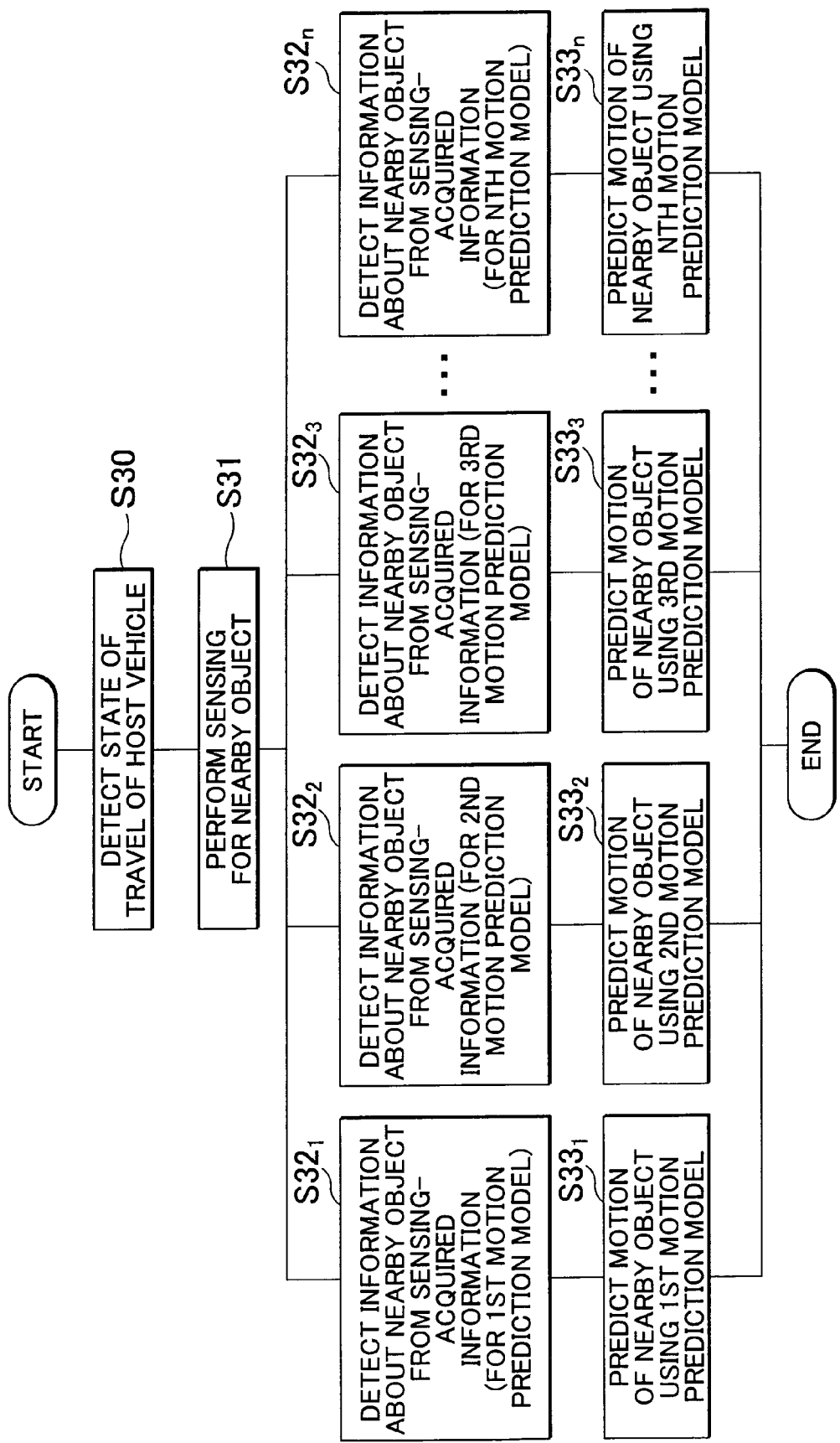

FIG. 13

| PARALLEL | SELECTION | HOW TO MAKE MOTION PREDICTION MODEL — MANIPULATION PROBABILITY | HOW TO MAKE MOTION PREDICTION MODEL — BEHAVIOR ELEMENT | PREDICTION TIME | TRAFFIC RULES (DESCENDING ORDER OF IMPORTANCE) — REMAIN IN FRICTION CIRCLE | DO NOT GO OUT OF ROAD | DO NOT RUN IN WRONG DIRECTION | RESPECT TRANSITION RULES | AVOID REAR-END COLLISION | RESPECT PRIORITY |
|---|---|---|---|---|---|---|---|---|---|---|
| A | 1 | UNIFORM DISTRIBUTION | | 1 | O | | | | | |
| A | 2 | UNIFORM DISTRIBUTION | | 1 | x | | | | | |
| B | 1 | ARBITRARY DISTRIBUTION | | 5 | O | O | O | O | O | O |
| B | 2 | (UNIFORM DISTRIBUTION) | | 5 | O | O | O | O | O | x |
| B | 3 | (STANDARD DISTRIBUTION) | | 5 | O | O | O | O | x | x |
| B | 4 | (MIXED STANDARD DISTRIBUTION) | | 5 | O | O | O | x | x | x |
| B | 5 | (NON-PARAMETRIC DISTRIBUTION) | | 5 | O | x | O | x | x | x |
| B | 6 | UNIFORM DISTRIBUTION | | 5 | O | O | O | O | O | O |
| C | 1 | | TRAVEL STRAIGHT | 10 | O | O | O | O | O | O |
| C | 2 | | RIGHT/LEFT TURN | 10 | O | O | O | O | O | x |
| C | 3 | | LANE CHANGE | 10 | O | O | O | O | x | x |

APPARATUS FOR PREDICTING THE MOVEMENT OF A MOBILE BODY

BACKGROUND OF THE INVENTION

1. Field of the Invention

The invention relates to a movement region prediction apparatus that predicts the movement region of a mobile body.

2. Description of the Related Art

A technology for predicting a travel course of a host vehicle and preventing the host vehicle from colliding with a mobile body, such as another vehicle or the like, which exists around the host vehicle in the predicted course has been developed. There also has been developed a technology for acquiring a target course that the host vehicle is to take in order to reach a destination, and for performing various travel controls or automatic driving in accordance with the target course. In this technology, too, it is important that the host vehicle travel while avoiding collision with surrounding mobile bodies. An apparatus described in Japanese Patent Application Publication No. 7-104062 (JP-A-7-104062) finds a predicted travel locus of a host vehicle and a predicted travel area thereof that has a predetermined extent on each of the two sides of the predicted travel locus on the basis of the yaw rate and the velocity of the host vehicle detected by sensors, and also finds a predicted travel locus of an obstacle (another vehicle or the like) and a predicted travel area thereof that has a predetermined extent on each of the two sides of the predicted travel locus on the basis of the position and the velocity of the obstacle that are detected by a radar. Furthermore, the apparatus calculates the point of the collision between the host vehicle and the obstacle or a point of proximity therebetween on the basis of the predicted travel area of the host vehicle and the predicted travel area of the obstacle, and determines the collision risk by calculating a target deceleration and a target reduced speed, and, if a risk of collision arises, performs a velocity control of the host vehicle according to the target deceleration and the target reduced speed.

In a common traffic environment, it is inevitable that a vehicle that is traveling in an abnormal manner and a vehicle that is traveling in a normal manner mingle, due to dozing at the wheel, drunk driving, or depending on the situation of compliance with traffic rules, etc. However, in the foregoing apparatuses, the area in which another vehicle moves is set uniformly for all vehicles. Therefore, if, assuming an abnormal vehicle, a broad area is set for each of the other vehicles around the host vehicle, the risk of collision of the host vehicle becomes high with respect to all the nearby vehicles (including normal vehicles), so that it becomes hard for the host vehicle to travel (see FIG. 2A). On the other hand, if, assuming a normal vehicle, a small area is set for each of the other vehicles around the host vehicle, the risk of collision of the host vehicle becomes low with respect to all the nearby vehicles, so that if an abnormal vehicle exists nearby, the safety of travel of the host vehicle declines (see FIG. 2B).

SUMMARY OF THE INVENTION

The invention provides a movement region prediction apparatus capable of predicting an appropriate movement region for each mobile body even in an environment where a normal mobile body and an abnormal mobile body mingle around a host vehicle.

A first aspect of the invention relates to a movement region prediction apparatus that includes: a mobile body detection device that detects a mobile body near a host vehicle; a prediction device that predicts a movement region of the detected mobile body; and a degree-of-normality acquisition device that acquires degree of normality of a situation of movement of the detected mobile body. The prediction device has a plurality of movement prediction models for predicting the movement region of the mobile body, and selects a movement prediction model from the plurality of movement prediction models based on the acquired degree of normality, and predicts the movement region of the mobile body using the selected movement prediction model.

The mobile body detection device detects a mobile body around the host vehicle, and the degree-of-normality acquisition device acquires the degree of normality (in other words, the degree of abnormality) of the situation of movement of the mobile body around the host vehicle. Furthermore, with regard to each mobile body, the prediction device selects a movement prediction model (may also select a plurality of models) from a plurality of movement prediction models on the basis of the degree of normality, and predicts the movement region of the mobile body using the selected movement prediction model. For example, as for a mobile body whose degree of normality is high, the range of movement thereof can be narrowed to a certain extent. On the other hand, with regard to a mobile body whose degree of normality is low (whose degree of abnormality is high), it is difficult to predict how it will move. Hence, a movement prediction model such that the movement region is made smaller the higher the degree of normality is, and is made larger the lower the degree of normality is applied. Thus, in the movement region prediction apparatus, since, with regard to each mobile body, a movement prediction model commensurate with the degree of normality of the mobile body is applied to predict the movement region thereof, an appropriate movement region can be predicted with regard to each mobile body even in an environment in which normal mobile bodies and abnormal mobile bodies mingle. By performing travel assist or automatic driving of the host vehicle using the movement regions provided individually for each mobile body, good safety in relation with mobile bodies and good efficiency in the travel of the host vehicle toward a destination can both be achieved even in an environment in which normal mobile bodies and abnormal mobile bodies mingle.

Incidentally, the mobile body is, for example, a vehicle, a motorcycle, a bicycle, a pedestrian, etc. The degree of normality of the situation of movement of a mobile body is found from, for example, the degree of weaving of the mobile body, the degree of compliance thereof with traffic rules, the acceleration/deceleration, the risk (collision probability) that the mobile body accepts regarding the collision with another object, etc. The plurality of movement prediction models may be individual movement prediction models that correspond to various degrees of normality.

A second aspect of the invention relates to a movement region prediction apparatus that includes: a mobile body detection device that detects a mobile body around a host vehicle; a prediction device that predicts a movement region of the detected mobile body; and a degree-of-normality acquisition device that acquires degree of normality of a situation of movement of the detected mobile body. The prediction device has a movement prediction model that has a prediction parameter for predicting the movement region of the mobile body, and determines a value of the prediction parameter based on the acquired degree of normality, and predicts the movement region of the mobile body using the movement prediction model whose prediction parameter has the determined value of the prediction parameter.

The mobile body detection device detects a mobile body around the host vehicle, and the degree-of-normality acquisition device acquires the degree of normality of the situation of movement of the mobile body around the host vehicle. Furthermore, with regard to each mobile body, the prediction device determines a value (may determine one value or also a plurality of values) of a prediction parameter of a movement prediction model based on the degree of normality of the mobile body, and predicts the movement region of the mobile body using the movement prediction model in which the prediction parameter has the determined value. Thus, in the movement region prediction apparatus, since, with regard to each mobile body, a movement prediction model in which the prediction parameter has a value commensurate with the degree of normality of the mobile body is applied to predict the movement region of the mobile body, an appropriate movement region can be predicted with regard to each mobile body even in an environment in which normal mobile bodies and abnormal mobile bodies mingle.

Examples of the prediction parameter include the degree of weaving of a mobile body, the degree of compliance with traffic rules, the acceleration/deceleration, the steering angle, the risk (collision probability) that a mobile body accepts regarding the collision with another object, etc. The prediction parameter may be the degree of normality itself. It is also possible to adopt a construction in which different parameter values commensurate with the degree of normality are substituted in a movement prediction model that has the degree of normality as a parameter, so that a plurality of movement prediction models are obtained. The number of prediction parameters that one movement prediction model has may be one or may also be more than one.

The degree-of-normality acquisition device may acquire the degree of normality based on a history of movement of the mobile body.

The degree-of-normality acquisition device detects a history of movement of the mobile body (past motions thereof), and acquires a degree of normality on the basis of the history of movement. Examples of the history of movement of a mobile body include the locus of time-series positions of the mobile body during a past-time travel of the mobile body, time-dependent changes in the speed (acceleration/deceleration) thereof, and time-dependent changes in the traveling direction, etc. For example, the degree of normality of a mobile body is low in the case where the positional change of the mobile body is large (the degree of weaving of the vehicle is large) during the past travel, the case where a change in the speed is large, or the case where a change in the traveling direction is large.

The degree-of-normality acquisition device may acquire the degree of normality based on position of the mobile body. Furthermore, the degree-of-normality acquisition device may acquire the degree of normality based on position and speed of the mobile body.

The degree of normality of a mobile body (a vehicle or the like) is low in the case where a change in the position of the mobile body is large and a change in the degree of weaving of the mobile body is large, or the case where a change in the speed thereof is large.

The degree-of-normality acquisition device may acquire the degree of normality based on state of a driver of the mobile body.

The degree-of-normality acquisition device may detect the state of the driver of a mobile body, and may acquire the degree of normality of the situation of movement of the mobile body based on the state of the driver. Examples of the state of a driver include the state of drunk, the state of arousal, the state of fatigue, the state of mind (irritation and the like), etc. For example, the degree of weaving of a vehicle is highly likely to become large in the case where the driver is drinking, or the case where the driver's arousal is low. In the case where the driver is irritated, the acceleration/deceleration is highly likely to become large. In these cases, the degree of normality is low. The method of acquiring information about the driver of a mobile body may be, for example, a method in which the state of the driver of the mobile body is detected by a sensor that is provided in the movement region prediction apparatus, or may also be a method in which the state of the driver of the mobile body is detected by a sensor that is attached to the mobile body or a road infrastructure or the like, and the information is distributed to the movement region prediction apparatus by vehicle-to-vehicle communication or road-to-vehicle communication. The data that is distributed may be the state of the driver related to the degree of normality, or may also be the degree of normality that is found from the state of the driver.

The degree-of-normality acquisition device may acquire the degree of normality based on a situation of compliance of the mobile body with a traffic rule. In particular, it is preferred that the situation of compliance with the traffic rule be a combination of degrees of compliance with a plurality of traffic rules that are prioritized.

The degree-of-normality acquisition device may detect the situation of compliance of a mobile body with traffic rules, and may acquire the degree of normality of the situation of movement of the mobile body on the basis of the situation of compliance with the traffic rules. The degree of normality is higher the higher the tendency to comply with traffic rules, and the degree of normality is lower the lower the tendency to comply with traffic rules. However, among a great number of traffic rules, there are various rules whose degrees of importance are different. Therefore, if the situation of compliance with traffic rules is a combination of the degrees of compliance with a plurality of traffic rules that are prioritized, it becomes possible to select an appropriate movement prediction model commensurate with what traffic rule is the lowest level of traffic rule above or at which the degree of compliance is high and what traffic rule is the highest level of traffic rule below or at which the degree of compliance is low. The degree of compliance may be binary values showing compliance and violation, or may also be three or more degrees of compliance.

A third aspect of the invention relates to a movement region prediction apparatus that includes: a mobile body detection device that detects a mobile body around a host vehicle; and a prediction device that predicts a movement region of the mobile body detected by the mobile body detection device. The prediction device has a plurality of movement prediction models that have different prediction times for predicting a movement region of a mobile body, and performs the prediction using a plurality of movement prediction models to predict the movement region of the mobile body.

The mobile body detection device detects each mobile body around the host vehicle. With regard to each mobile body, the prediction device performs predictions parallelly by using a plurality of movement prediction models whose prediction times are different, and thereby predicts movement regions of the mobile body. Thus, in the movement region prediction apparatus, since, with regard to each mobile body, the movement region thereof is predicted using a plurality of movement prediction models that have different prediction times, an appropriate movement region can be predicted with regard to each mobile body even in an environment in which normal mobile bodies and abnormal mobile bodies mingle.

Incidentally, the prediction times of the plurality of movement prediction models may be the same, or may also be all different times.

The movement region prediction apparatus of this aspect of the invention may further include a degree-of-normality acquisition device that acquires degree of normality of a situation of movement of the detected mobile body, and the prediction device may select a movement prediction model from the plurality of movement prediction models based on the degree of normality acquired by the degree-of-normality acquisition device, and may predict the movement region of the mobile body using the selected movement prediction model.

The degree-of-normality acquisition device acquires the degree of normality of the situation of movement of each mobile body around the host vehicle. Then, with regard to each mobile body, the prediction device selects movement prediction models having different prediction times from the plurality of movement prediction models on the basis of the degree of normality, and performs predictions parallelly by using the selected movement prediction models that have different prediction times, and thereby predicts the movement region of the mobile body. In the case where a mobile body that is normal in the situation of movement is subjected to the prediction through the use of a movement prediction model prepared for a normal mobile body, the movement region of the mobile body is limited to a certain extent even if the prediction time is long; therefore, even in the case where the prediction time is long, the prediction results are reliable, and safety between the mobile body and the host vehicle can be secured. On the other hand, in the case where a mobile body that is abnormal in the situation of movement is subjected to the prediction through the use of a prediction model prepared for a normal mobile body, since the movement region expands to larger regions as the prediction time is increased; therefore, if the prediction time is long, the prediction results are not reliable, and the safety between the mobile body and the host vehicle cannot be secured. However, even in the case where the prediction is performed through the use of a movement prediction model prepared for an abnormal mobile body, if the prediction time is short, the movement region is limited, so that the prediction results are reliable and therefore the safety between the mobile body and the host vehicle can be secured.

Hence, even in the case where the prediction is performed with regard to a mobile body that is normal in the situation of movement, the prediction with a short prediction time is performed using a movement prediction model prepared for a mobile body that is abnormal in the situation of movement, so that it becomes possible to cope with the case where the mobile body suddenly falls into an abnormal situation of movement without losing the reliability of the prediction results. Thus, safety can be further improved. Besides, in the case of the prediction with a long prediction time, necessary prediction can be performed by performing the prediction through the use of a movement prediction model prepared for a mobile body that is normal in the situation of movement. Hence, in this movement region prediction apparatus, in the case where the movement prediction of a mobile body that is normal in the situation of movement is performed parallelly by a plurality of movement prediction models, it is preferred that the prediction with short prediction times be performed using movement prediction models prepared for a mobile body that is abnormal in the situation of movement, and that the prediction in conjunction with long prediction times be performed using movement prediction models prepared for a mobile body that is normal in the situation of movement.

A fourth aspect of the invention relates to a movement region prediction apparatus that includes: a mobile body detection device that detects a mobile body around a host vehicle; and a prediction device that predicts a movement region of the mobile body detected by the mobile body detection device. The prediction device has a movement prediction model in which a prediction parameter for predicting the movement region of the mobile body is variable, and performs prediction using the movement prediction model whose prediction time is variable, and predicts the movement region of the mobile body.

The mobile body detection device detects each mobile body around the host vehicle. With regard to each mobile body, the prediction device varies the prediction time in the movement prediction model, and performs the prediction with the various prediction times, and thereby predicts movement regions of the mobile body. Thus, in the movement region prediction apparatus, since with regard to each mobile body, the movement region is predicted using a movement prediction model with varied prediction times, an appropriate movement region can be predicted with regard to each mobile body even in an environment in which normal mobile bodies and abnormal mobile bodies mingle.

The movement region prediction apparatus may further include a degree-of-normality acquisition device that acquires the degree of normality of a situation of movement of the mobile body detected by the mobile body detection device, and the prediction device may determine the prediction time based on the degree of normality acquired by the degree-of-normality acquisition device, and may predict the movement region of the mobile body using the movement prediction model whose prediction time is equal to the prediction time determined.

The degree-of-normality acquisition device acquires the degree of normality of the situation of movement of each mobile body around the host vehicle. With regard to each mobile body, the prediction device determines a prediction time on the basis of the degree of normality, and performs the prediction using the movement prediction model whose prediction time is equal to the determined prediction time, and thereby predicts the movement region of the mobile body.

In the movement region prediction apparatus in accordance with the invention, it is preferred that a plurality of results of the determination that are parallelly provided by the plurality of movement prediction models be evaluated in an order of increasing lengths of the prediction times of the prediction results.

As for the movement prediction models, the shorter the prediction time, the higher the reliability, and the smaller the predicted movement region. Therefore, in order to heighten safety in the relation between mobile bodies and the host vehicle, it is necessary to certainly avoid the predicted movement regions whose prediction times are relatively short (which are predicted to occur relatively near in the future). To that end, the movement region prediction apparatus evaluates results of the prediction in the order of increasing lengths of the prediction times of the prediction results (movement regions), so that safety can be secured. For example, results of the prediction are sequentially output in the order of increasing lengths of the prediction times. Then, if it is determined that a result of the prediction based on a certain prediction time crosses with a future position of the host vehicle, it can be determined that a collision is imminent. Therefore, the movement region prediction apparatus aborts the present process at the point of evaluating the result of the prediction based on that certain prediction time, and shifts to a process for avoiding the collision.

In the invention, since the movement region of a mobile body is predicted by applying a movement prediction model commensurate with the prediction time or the degree of normality of the driver of that mobile body, an appropriate movement region can be predicted with regard to each mobile body even in an environment in which normal mobile bodies and abnormal mobile bodies mingle.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1 is a construction diagram of a motion prediction apparatus in accordance with a first embodiment of the invention;

FIG. 9 is a flowchart showing a flow of operation performed by the motion prediction apparatus shown in FIG. 5;

FIG. 12 is a flowchart showing a flow of operation performed by the motion prediction apparatus shown in FIG. 10; and FIG. 13 is a table showing an example of the method of selecting motion prediction models in the case where a sequential process and parallel predictions are combined.

DETAILED DESCRIPTION OF EMBODIMENTS

A motion prediction apparatus in accordance with an embodiment of the invention predicts motions of objects (mobile bodies) around or near a host vehicle (hereinafter, also termed the nearby objects) using a plurality of motion prediction models, and supplies results of the prediction to various driving-assist apparatuses (collision prevention apparatuses, and the like) or to an automatic driving apparatus, or the like. In a first embodiment of the invention, a motion prediction model for a nearby object is selected according to the degree of normality of the nearby object. In a second embodiment, a motion prediction model for a nearby object is selected according to the situation of compliance of the nearby object with traffic rules. In a third embodiment, the motion prediction is performed parallelly using a plurality of motion prediction models.

Figure 2A:
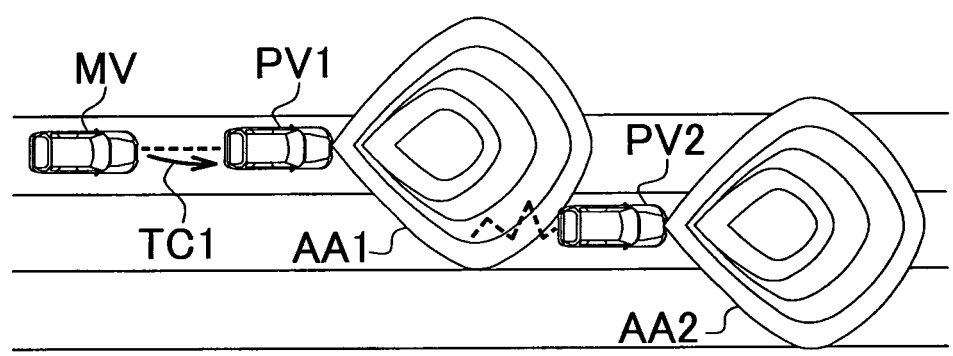
FIGS. 2A and 2B show examples of results of the motion prediction performed by a related-art motion prediction apparatus with regard to vehicles ahead of the host vehicle, and respectively show the case where all the vehicles are assumed to be abnormal vehicles, and the case where all the vehicles are assumed to be normal vehicles.
Figure 2B:
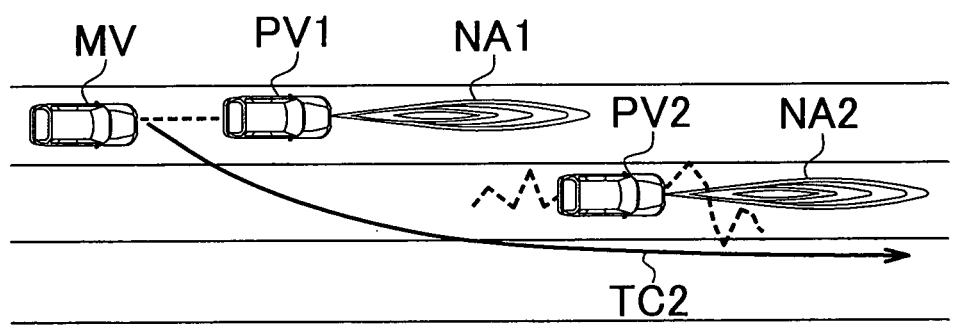
Figure 3:
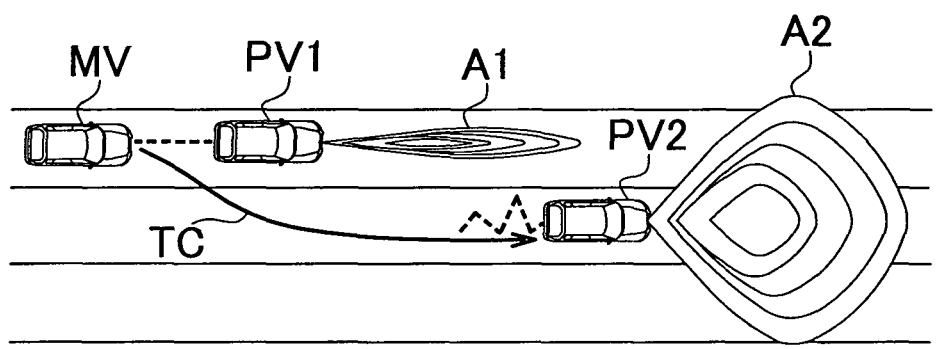
FIG. 3 shows examples of results of the motion prediction by the motion prediction apparatus shown in FIG. 1 with regard to vehicles ahead of the host vehicle.

With reference to FIGS. 1 to 3, a motion prediction apparatus 1 in accordance with the first embodiment will be described. FIG. 1 is a construction diagram of a motion prediction apparatus in accordance with the first embodiment. FIGS. 2A and 2B show examples of results of the motion prediction performed by a related-art motion prediction apparatus with regard to vehicles ahead of the host vehicle, and respectively show the case where all the vehicles are assumed to be abnormal vehicles, and the case where all the vehicles are assumed to be normal vehicles. FIG. 3 shows examples of results of the motion prediction by the motion prediction apparatus shown in FIG. 1 with regard to vehicles ahead of the host vehicle.

With regard to each of the objects near or around the host vehicle, the motion prediction apparatus 1 selects from a plurality of motion prediction models a motion prediction model that is suitable to the nearby object, and predicts the motion of the nearby object on the basis of the selected motion prediction model. In particular, the motion prediction apparatus 1 estimates the degree of normality of each nearby object in a situation of movement, and selects a motion prediction model for each nearby object commensurate with the degree of normality thereof. Therefore, the motion prediction apparatus 1 includes traveling information acquisition means 10, object detection means 11, degree-of-normality estimation means 12, motion prediction model selection means 13 and motion prediction means 14. The object detection means 11, the degree-of-normality estimation means 12, the motion prediction model selection means 13 and the motion prediction means 14 are constructed in an ECU (Electronic Control Unit) that is made up of a CPU (Central Processing Unit), a ROM (Read-Only Memory), a RAM (Random Access Memory), etc.

Incidentally, in the first embodiment, the traveling information acquisition means 10 and the object detection means 11 can be regarded as a mobile body detection device, and the degree-of-normality estimation means 12 can be regarded as a degree-of-normality acquisition device, and the motion prediction model selection means 13 and the motion prediction means 14 can be regarded as a prediction device, and the plurality of motion prediction models that are prepared beforehand by the motion prediction model selection means 13 can be regarded as a plurality of movement prediction models.

The traveling information acquisition means 10 acquires sensing-acquired information about the state of travel of host vehicles, objects near the host vehicle, and prior knowledge, etc.

The state of travel of the host vehicle includes the velocity, the acceleration, the steering angle, the present position, etc. Examples of the means for detecting the foregoing information include various sensors of the speed, the acceleration, the steering angle, etc., and also include a GPS reception apparatus, a car navigation apparatus, etc.

Examples of the sensing means for detecting objects around or near the host vehicle include various radars, such as a millimeter wave radar or the like, cameras (image sensors) such as a stereo camera or the like, a laser range finder, etc. Examples of the sensing-acquired information include data detected at every point of detection by a radar (a light emission time, a light reception time, a scanning direction, a reflectivity), picked-up images by a camera, data detected by a laser range finder.

The prior knowledge is various types of information that can be acquired in advance and that are needed for the traveling of vehicles, including road maps, various traffic rules that are associated in correspondence with positions on roads (e.g., one-way traffic, speed limits, stop signs, dividing lines (yellow lines, white lines), priority roads and non-priority roads), traffic lights, etc. The prior knowledge is stored beforehand in a database that is constructed in the motion prediction apparatus 1, and, according to the present location of the host vehicle, information about the present location and its surrounding areas is extracted from the database.

The object detection means 11 detects nearby objects around the host vehicle on the basis of the sensing-acquired information that is detected by the traveling information acquisition means 10. Concretely, the object detection means 11 attempts to detect a nearby object by performing the processing of data obtained by a laser at each detection point, and performing the image processing of picked-up images, etc. Then, if a nearby object is detected, the object detection means 11 calculates information about that nearby object. Examples of the nearby objects include mobile bodies, such as vehicles, motorcycles, bicycles, pedestrian, etc. The information about nearby objects include relative positions thereof (x, y) relative to the host vehicle, speeds thereof relative to the host vehicle or absolute speeds thereof, directions thereof relative to the host vehicle or absolute directions thereof, the directions of tire wheels thereof relative to the vehicle bodies in the case of vehicles, etc.

With regard to each of the nearby objects detected by the object detection means 11, the degree-of-normality estimation means 12 estimates the degree of normality of the behavior (state of movement) the nearby object, utilizing the past-time motions of the nearby object. Examples of the past motions include loci of positions in time series, time-dependent changes in velocity (acceleration/deceleration), and a time-dependent changes in the traveling direction. As for the method of estimating the degree of normality, the degree of normality of a nearby object is estimated from the degree of weaving of the nearby object, the degree of compliance thereof with the traffic rules, the acceleration/deceleration (with an allowable acceleration/deceleration), the risk (collision probability) that the nearby object accepts regarding the collision with another object, etc. The degree of weaving of a nearby object is estimated from the locus of the position of the nearby object in time series, or the like. The degree of compliance of a nearby object with the traffic rules is estimated by comparing the time-series locus of the position of the nearby object, the speed thereof, etc., with the various traffic rules around the present position of the host vehicle, the states of traffic lights, etc. The collision probability with a nearby object is estimated from the loci of the time-series positions of the nearby object, other nearby objects and the host vehicle, time-dependent changes in the speeds thereof, time-dependent changes in the directions thereof, etc.

The degree of normality is the degree of the normality of the situation of movement of a nearby object. The degree of normality of a nearby object is higher the more normal the situation of movement thereof, and is lower the more abnormal the situation of movement thereof. For example, the degree of normality of a nearby object is lower the greater the weaving of the nearby object, and the degree of normality thereof is lower the lower the degree of compliance thereof with the traffic rules. Furthermore, the degree of normality of a nearby object is lower the higher the collision probability that the nearby object accepts, and is lower the greater the acceleration/deceleration thereof. The degree of normality may have a plurality of parameters. In such a case, a normal degree is set separately for each parameter. For example, the degree of normality in the left-right direction can be provided on the basis of the degree of weaving and the like. The degree of normality in the left-right direction is lower the greater the degree of weaving. Besides, the degree of normality in the traveling direction can be provided on the basis of the acceleration/deceleration or the like. The degree of normality in the traveling direction is lower the greater the acceleration/deceleration.

With regard to each of the nearby objects detected by the object detection means 11, the motion prediction model selection means 13 selects an optimum motion prediction model commensurate with the degree of normality estimated by the degree-of-normality estimation means 12. A plurality of motion prediction models are stored beforehand in the database that is constructed in the motion prediction apparatus 1. The motion prediction model selection means 13 searches the database using the degree of normality as a key, and extracts from the database a motion prediction model commensurate with the degree of normality.

The motion prediction models are prepared according to the degrees of normality. Each motion prediction model, after inputting information about a nearby object (the position, the speed, the direction, etc., thereof), outputs the range in which the object is expected to exist after a predetermined time (e.g., after 5 seconds) as a motion of the nearby object. This range of existence may be only a range, or may also have the probability of existence of the object within the range. Each motion prediction model predicts a range of existence (provided with the probability of existence according to the need) according to the degree of normality (see FIG. 3). The range of existence and the probability of existence predicted in this manner varies in the size and shape of the range, the value of probability in the range, etc. For example, the motion prediction models are such that the lower the degree of normality in the left-right direction is, the broader in the left-right direction the range of existence becomes, and the lower the probability of existence thereof in the range becomes. Besides, the motion prediction models are such that the lower the degree of normality in the traveling direction is, the longer the length thereof in the traveling direction becomes, and the lower the probability of existence becomes.

The motion prediction means 14 predicts, with regard to each of the nearby objects detected by the object detection means 11, the motion of the nearby object using the motion prediction models thereof selected by the motion prediction model selection means 13. Concretely, the motion prediction means 14, with regard to each nearby object, inputs information about the nearby object into the motion prediction model selected for the nearby object, and outputs the range of existence of the nearby object (and the probability of existence thereof if necessary) by the motion prediction model.

FIGS. 2A and 2B show cases where, on a road with three lanes going in the same direction, a host vehicle MV is traveling in the left-side lane of the three lanes, and another vehicle PV1 is traveling in the left lane in front of the host vehicle MV, and still another vehicle PV2 is traveling in the middle lane in front of the host vehicle MV. In this case, the other vehicle PV1 is traveling normally, and the vehicle PV2 is greatly weaving, that is, traveling abnormally.

FIG. 2A shows a case where the motion prediction is performed assuming that all the other vehicles are abnormal vehicles. In this case, broad ranges of existence AA1 and AA2 in which the other vehicles PV1 and PV2 are to exist after a predetermined time are predicted. The predicted ranges AA1 and AA2 greatly extend beyond the lanes in which the other vehicles PV1 and PV2 are traveling, respectively. Therefore, if a target course of the host vehicle MV is generated in this case, a target course TC1 in which the host vehicle MV moves little by little in the rear of the other vehicle PV1 is generated in order to secure safety between the host vehicle and the other vehicles PV1 and PV2. In the case where the host vehicle MV travels following the target locus TC1, it becomes hard to move toward the destination.

FIG. 2B shows a case where the motion prediction is performed assuming that all the other vehicles are normal vehicles. In this case, small ranges of existence NA1 and NA2 in which the other vehicles PV1 and PV2 are to exist after a predetermined time are predicted. The predicted ranges NA1 and NA2 greatly extend beyond the lanes in which the other vehicles PV1 and PV2 are traveling, respectively. Therefore, if a target course of the host vehicle MV is generated in this case, a target course such that the host vehicle MV moves in a lane extending at the side of the other vehicles PV1, PV2 can be generated; concretely, a target course TC2 such that the host vehicle MV changes lanes to move at the right side of the other vehicle PV2 is generated. However, in the case where the host vehicle MV travels following the target locus TC2, the probability of collision of the host vehicle MV with the other vehicle PV that greatly weaves becomes high, and thus safety declines.

FIG. 3 shows a case where the motions of the other vehicles PV1 and PV2 are predicted by applying a motion prediction apparatus 1 in a situation as shown in FIGS. 2A and 2B. In this case, for the other vehicle PV1 that is traveling in a normal manner, a motion prediction model with high degree of normality is selected. Using this motion prediction mode, a small range of existence A1 in which the other vehicle PV1 is to exist after a predetermined time is predicted. On the other hand, with regard to the other vehicle PV2 that is traveling in an abnormal manner, a motion prediction model with low degree of normality is selected. Using this motion prediction model, a broad range is predicted as the range of existence A2 in which the other vehicle PV2 is to exist after a predetermined time with regard to each probability of existence. Therefore, if in the generation of a target course of the host vehicle MV, safety is secured in relation with the other vehicles PV1 and PV2, a target course TC such that the host vehicle MV changes to the lane extending at the right side of the other vehicle PV1 (to the middle lane) and moves in the rear of the other vehicle PV2 is generated. In the case where the host vehicle MV travels following the target locus TC, the efficiency of the host vehicle MV moving toward the destination improves while safety is secured.

Figure 4:
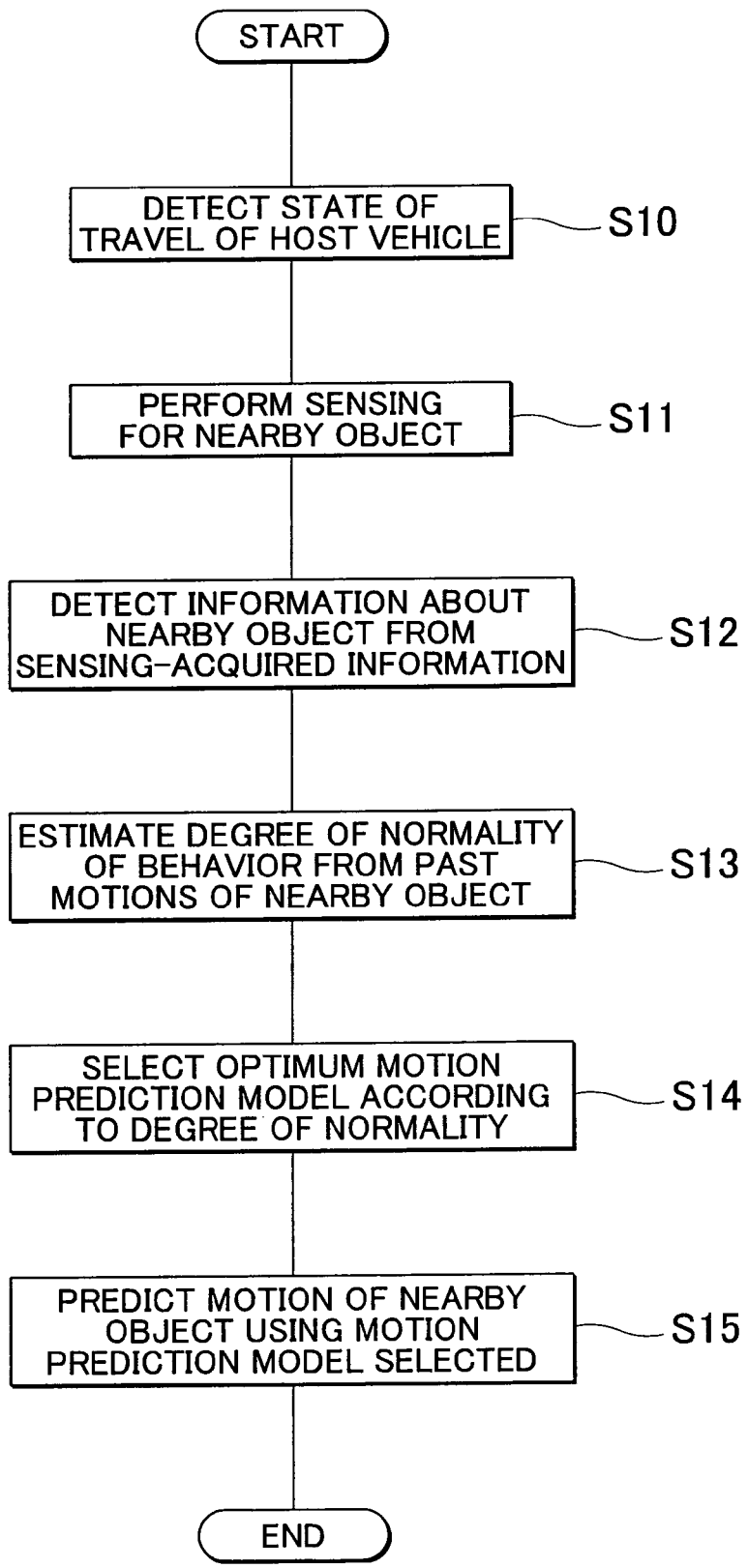
FIG. 4 is a flowchart showing a flow of operation performed by the motion prediction apparatus shown in FIG. 1.

With reference to FIG. 1, an operation of the motion prediction apparatus 1 will be described using the flowchart shown in FIG. 4. FIG. 4 is a flowchart showing a flow of operation of the motion prediction apparatus shown in FIG. 1.

The motion prediction apparatus 1 detects the state of travel of the host vehicle (S10). Besides, the motion prediction apparatus 1 performs sensing for nearby objects around the host vehicle (S11). Then, the motion prediction apparatus 1 detects information about each nearby object on the basis of the sensing-acquired information obtained in S11 (S12).

With regard to each nearby object, the motion prediction apparatus 1 estimates the degree of normality of behavior of the nearby object on the basis of the past motions of the nearby object (S13). Then, the motion prediction apparatus 1 selects an optimum motion prediction model according to the degree of normality (S14). Furthermore, the motion prediction apparatus 1 predicts motions of the nearby objects using the selected motion prediction models (S15).

Then, the motion prediction apparatus 1 outputs results of the prediction of the motion of each of the nearby objects to various driving-assist apparatuses or an automatic driving apparatus.

According to this motion prediction apparatus 1, by predicting the movement of a nearby object (mobile body) by a motion prediction model commensurate with the degree of normality of behavior of the nearby object, an appropriate movement region can be predicted with regard to each mobile body even in an environment in which normal mobile bodies and abnormal mobile bodies mingle. By performing a travel assist on the host vehicle or performing the automatic driving of the host vehicle through the use of results of the prediction regarding each mobile body, the efficiency of the host vehicle moving to a destination and safety between mobile bodies can both be achieved even in an environment where normal mobile bodies and abnormal mobile bodies mingle.

Figure 5:
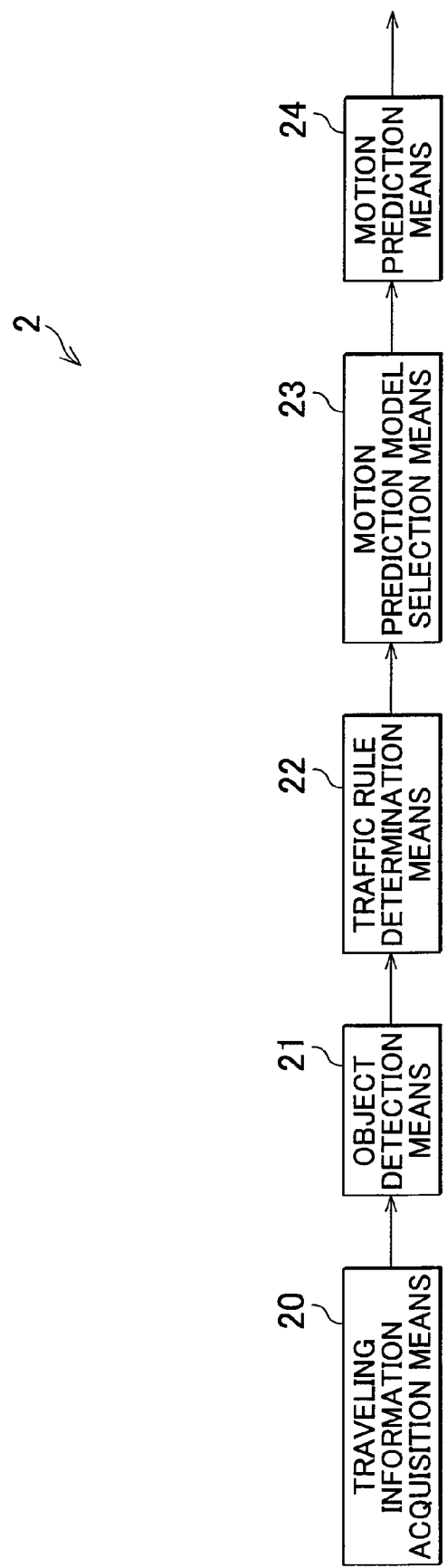
FIG. 5 is a construction diagram of a motion prediction apparatus in accordance with a second embodiment of the invention.
Figure 6:
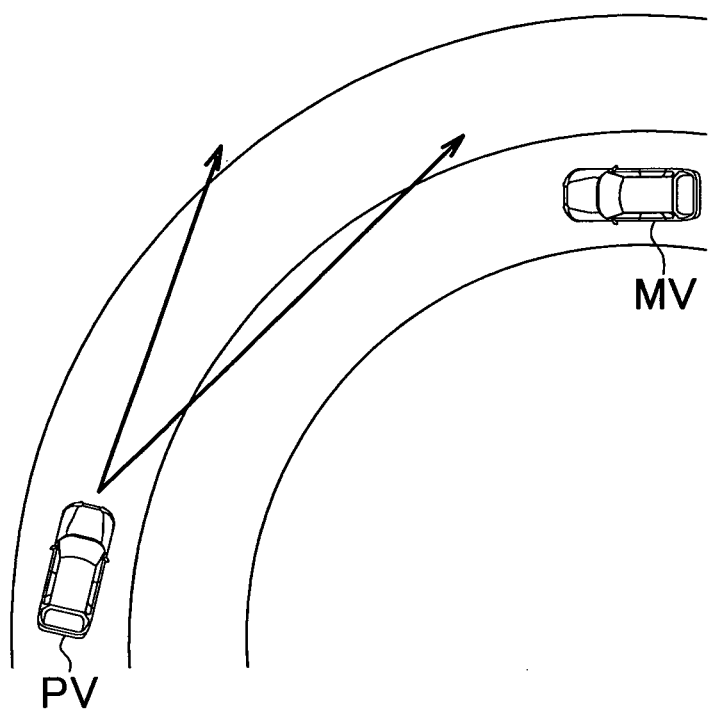
FIG. 6 shows an example of the motion of a vehicle on a curved road.
Figure 7:
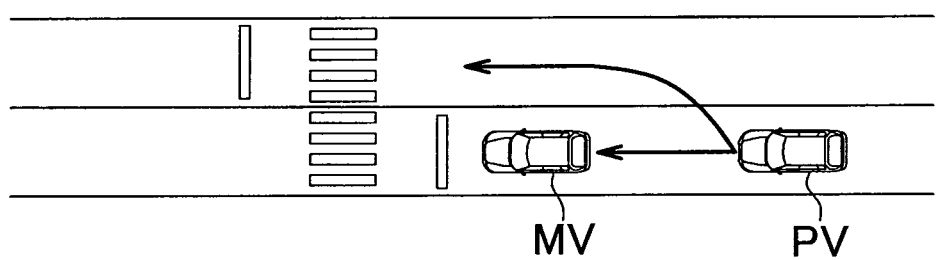
FIG. 7 shows an example of the motion of a vehicle in the case where there is another vehicle that is stopped ahead of the vehicle.
Figure 8A:
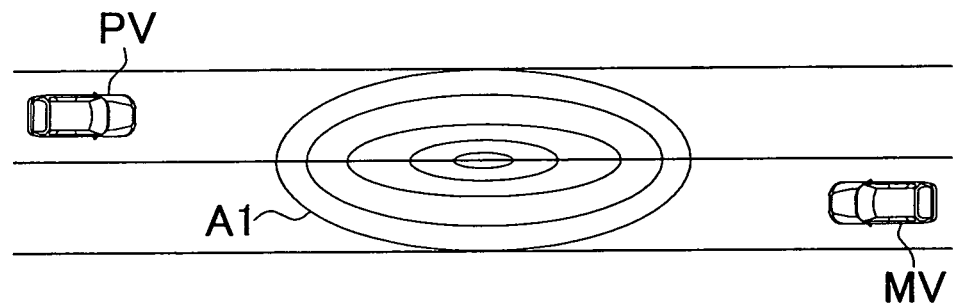
FIGS. 8A, 8B and 8C show examples of results of the motion prediction performed using motion prediction models, and respectively show results of the motion prediction by a motion prediction model in which an oncoming vehicle traveling in the on-coming lane, not in the wrong-direction lane, is assumed to come into the wrong-direction lane, results of the motion prediction by a motion prediction model in which an on-coming vehicle traveling in the wrong-direction lane is assumed to keep traveling in the wrong-direction lane, and results of the motion prediction by a motion prediction model in which an on-coming vehicle traveling in the on-coming lane, not in the wrong-direction lane, is assumed to remain in the lane.
Figure 8B:
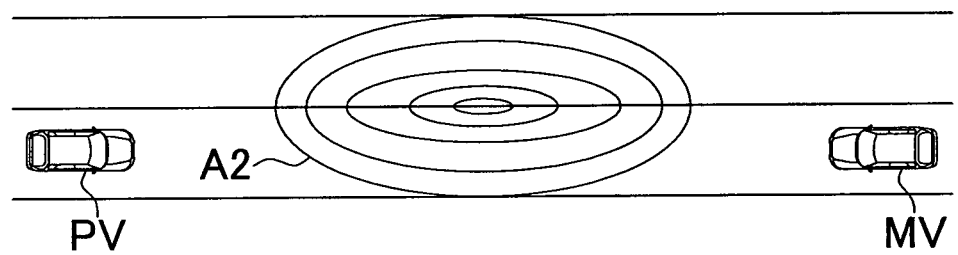
Figure 8C:
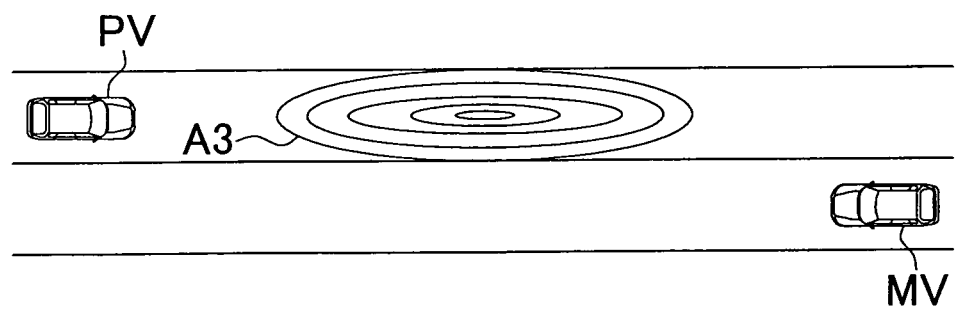

With reference to FIG. 5 to FIG. 8C, a motion prediction apparatus 2 in accordance with a second embodiment of the invention will be described. FIG. 5 is a construction diagram of a motion prediction apparatus in accordance with the second embodiment. FIG. 6 shows an example of the motion of a vehicle on a curved road. FIG. 7 shows an example of the motion of a vehicle in the case where there is another vehicle that is stopped ahead of the vehicle. FIGS. 8A, 8B and 8C show examples of results of the motion prediction performed using motion prediction models, and respectively show results of the motion prediction by a motion prediction model in which an oncoming vehicle PV traveling in the on-coming lane, not in the wrong-direction lane, is assumed to come into the wrong-direction lane, results of the motion prediction by a motion prediction model in which an on-coming vehicle PV traveling in the wrong-direction lane is assumed to keep traveling in the wrong-direction lane, and results of the motion prediction by a motion prediction model in which an on-coming vehicle traveling in the on-coming lane, not in the wrong-direction lane, is assumed to remain in the lane.

With regard to each object that exists near or around the host vehicle, the motion prediction apparatus 2 selects from a plurality of motion prediction models a motion prediction model suitable to the nearby object, and predicts the motion of the nearby object on the basis of the selected motion prediction model. In particular, the motion prediction apparatus 2, with regard to each nearby object, determines the degree of compliance thereof with respect to each of traffic rules, and selects a motion prediction model commensurate with the traffic rule with which the degree of compliance is low and which has the highest degree of importance among the traffic rules with which the degree of compliance is low. To that end, the motion prediction apparatus 2 includes traveling information acquisition means 20, object detection means 21, traffic rule determination means 22, motion prediction model selection means 23, and motion prediction means 24. The object detection means 21, the traffic rule determination means 22, the motion prediction model selection means 23 and the motion prediction means 24 are constructed within an ECU that is made up of a CPU, a ROM, a RAM, etc. Incidentally, the traveling information acquisition means 20, the object detection means 21 and the motion prediction means 24 are substantially the same as the traveling information acquisition means 10, the object detection means 11 and the motion prediction means 14 of the first embodiment. Therefore, descriptions thereof will be omitted.

Incidentally, in the second embodiment, the traveling information acquisition means 20 and the object detection means 21 can be regarded as a mobile body detection device, and the traffic rule determination means 22 can be regarded as a degree-of-normality acquisition device, and the motion prediction model selection means 23 and the motion prediction means 24 can be regarded as a prediction device, and a plurality of motion prediction models prepared beforehand by the motion prediction model selection means 23 can be regarded as a plurality of movement prediction models.

With regard to each nearby object detected by the object detection means 21, the traffic rule determination means 22 determines the degrees of compliance of the nearby object with a plurality of traffic rules, on the basis of the motion of the nearby object in the past and the present state of travel thereof. The term traffic rules in this application is a concept that collectively includes various traffic regulations and correct traffic manners as well. Therefore, the traffic rules herein include a minimum standard of manners that ought to be observed in conjunction with the travel or driving of vehicles, including a manner of driving a vehicle so as that the vehicle does not spin (so that the vehicle remains in the friction circle), a manner of driving a vehicle so that the vehicle remains within a road surface.

Concretely, the traffic rule determination means 22 determines the degrees of compliance of each nearby object with traffic rules separately for each traffic rule, on the basis of the past motions and the present state of travel of the nearby object as well as traffic rules commensurate with the direction of the nearby object. The degree of compliance may be binary values showing compliance and violation, or may also be three or more degrees of compliance (degrees of violation). The traffic rules include traffic rules that are extracted from the database (speed limits, or the like) using the present positions of the nearby objects and the directions of the nearby objects as a key, and traffic rules that are always applied to nearby objects regardless of the present position of the nearby objects and the direction of the nearby objects (a manner of driving the vehicle so that the vehicle does not spin, or the like). Besides, the traffic rules that are applied to nearby objects may be acquired using vehicle-to-vehicle communications or road-to-vehicle communications.

In the case where it is determined simply in a manner of a choice between two whether a nearby object is complying with the traffic rules (whether the nearby object is complying with all the traffic rules are being observed or violating them), the behavior of the driver of a nearby object with respect to the traffic rules cannot be accurately determined. For example, with regard to a vehicle that is traveling about 10 km/h above a speed limit, it is not accurate or precise to universally determine that the vehicle is a vehicle that violates traffic rules. Therefore, the compliance is determined with respect to each of a plurality of traffic rules, and the behavior of each nearby object with respect to the traffic rules is accurately determined.

The following description is given in conjunction with a plurality of traffic rules as shown in FIG. 13, that is, "Remain in the friction circle.", "Do not go out of the road.", "Do not run in the wrong direction.", "Observe transition rules.", "Avoid collision.", "Respect priority.", as examples. "Remain in the friction circle." is to travel so that the resultant force of the lateral force of the vehicle and the longitudinal force of the vehicle does not exceed the limit of the friction of the tires. If the friction circle is exceeded, the vehicle becomes impossible to control. "Do not go out of the road." is that vehicles need to travel within a road. "Do not run in the wrong direction." is to avoid traveling in the on-coming traffic lane when traveling on a road. "Observe transition rules." is to observe transition rules, such as a rule of avoiding crossing a yellow line, a rule of stopping before a stop line for a red traffic light, etc. "Avoid rear-end collision." is to avoid bumping into the rear of a vehicle ahead. "Respect priority." is that a vehicle traveling on a non-priority road gives priority to a vehicle that is traveling on a priority road. By determining the degree of compliance with these six traffic rules, it is possible to accurately determine the behavior of a driver with respect to traffic rules.

The motion prediction model selection means 23, with regard to each nearby object detected by the object detection means 21, selects an optimum motion prediction model commensurate with the degrees of compliance thereof with a plurality of traffic rules which are determined by the traffic rule determination means 22. A plurality of motion prediction models are stored beforehand in a database that is constructed in the motion prediction apparatus 2.

Concretely, the motion prediction model selection means 23 sorts the degrees of compliance of the nearby objects with a plurality of traffic rules, according to the degrees of importance of the traffic rules (prioritizes the traffic rules). Due to this, it becomes possible to determine what level of traffic rule is the lowest level of traffic rule above or at which traffic rules are complied with (the degree of compliance is high) and what level of traffic rule is the highest level of traffic rule below or at which traffic rules are violated (the degree of compliance is low). Then, the motion prediction model selection means 23 searches the database using as a key the traffic rule whose degree of importance is the highest of the traffic rules with which the degree of compliance is low (which tend to be violated), and extracts from the database a motion prediction model that corresponds to the case where the key traffic rule and the traffic rules of lower degrees of importance are assumed to be violated.

The plurality of traffic rules have different degrees of importance; for instance, some traffic rules absolutely need to be complied with, for safety reasons. Besides, the drivers of the nearby objects also tend to comply with traffic rules according to the degrees of importance. For example, a driver who drives in the wrong direction in an on-coming traffic lane or ignores red traffic lights is hardly expected to give priority to a vehicle on a priority road, while traveling in a non-priority road. Conversely, a driver who respects the relation between a priority road and a non-priority road is hardly expected to drive in the wrong direction in the on-coming traffic lane or ignore a red traffic light. Therefore, it becomes possible to more accurately determine how the driver reacts with respect to traffic rules by fixing an order of priority of a plurality of traffic rules according to the degrees of importance thereof, and determining a level of importance at and above which traffic rules tend to be complied with, and a level of importance at and below which traffic rules tend to be violated. Thus, the range of motions of the nearby objects can be predicted according to the level of compliance with traffic rules.

The degrees of importance (priorities) of the foregoing six traffic rules will now be considered. The degree of importance of "Remain in the friction circle." is the highest because if the vehicle exceeds the friction circle, there is possibility of it becoming impossible to control the vehicle and comply with the other traffic rules. The degree of importance of "Do not go out of the road." is the second highest because it is an essential requirement to travel inside the road's boundary. Then, the degree of importance of the "Do not run in the wrong direction" is the third highest because the prohibition of the running in the wrong direction in the on-coming traffic lane needs absolutely to be observed. For example, a case as shown in FIG. 6 will be considered. In the case where a host vehicle MV is traveling on a curved road and one other vehicle PV is coming from ahead in the oncoming traffic lane, if the other vehicle PV comes to unable to stay in the present lane, it is generally expected that the driver of the other vehicle PV will choose to temporarily run in the wrong direction in the oncoming traffic lane rather than to go out of the road.

Subsequently, the degree of importance of the "Observe transition rules." is the next highest because the traffic lights, the yellow lines, etc. need to be observed as traffic orders during driving. Furthermore, the degree of importance of "Avoid rear-end collision." is the next highest. As shown in FIG. 7, in a situation where while a host vehicle MV is at a stop, one other vehicle PV is traveling from behind at high vehicle speed and cannot stop behind the host vehicle MV, it is generally predicted that the driver of the other vehicle PV will choose to crash into the host vehicle MV from behind rather than to run in the oncoming traffic lane in the wrong direction.

Motion prediction models are prepared according to a plurality of traffic rules while being prioritized, that is, ranked in an order of priority. Each motion prediction model predicts the range of existence in which a nearby object is predicted to exist after a predetermined time (and, if necessary, the probability of existence thereof as well) commensurate with the case where, among the traffic rules ranked in the order of priority, a given traffic rule and all the traffic rules that are lower in the order of priority than the given traffic rule are assumed to be violated. The predicted range of existence and the predicted probability of existence differ in the size and shape of the predicted ranges, the value of probability in the predicted ranges, etc., commensurate with the case where a given traffic rule and the traffic rules subsequent thereto in priority are assumed to be violated. For example, in the case where a traffic rule of a high degree of importance and all the traffic rules that are subsequent thereto in priority are to be violated, a motion prediction model such that the range of existence of a nearby object is broad and the probability of existence thereof is low is selected. In the case where all the traffic rules are complied with, such a motion prediction model that the entire range of existence of a nearby object is very small and the probability of existence thereof at the center of the range is high is selected.

In the case where the six traffic rules mentioned above as an example are adopted, the motion prediction models prepared are a motion prediction model commensurate with the case where all the six traffic rules are to be violated, a motion prediction model commensurate with the case where the rule "Do not go out of the road." and all the traffic rules subsequent in priority thereto are to be violated, a motion prediction model commensurate with the case where the rule "Do not run in the wrong direction." and all the traffic rules subsequent in priority thereto are to be violated, a motion prediction model commensurate with the case where the rule "Observe transition rules." and all the traffic rules subsequent in priority thereto are to be violated, a motion prediction model commensurate with the case where the rule "Avoid rear-end collision." and all the traffic rules subsequent in priority thereto are to be violated, a motion prediction model commensurate with the case where the rule "Respect priority." is to be violated, and a motion prediction model commensurate with the case where all the six traffic rules are to be observed.

FIGS. 8A to 8C show cases where while a host vehicle MV is traveling, one other vehicle PV is travelling toward the host vehicle MV from ahead in its cruising lane, or in the oncoming traffic lane in the wrong direction (the cruising lane of the host vehicle MV). In FIG. 8A, in the case where the other vehicle PV coming from ahead of the host vehicle MV is traveling in the cruising lane, a motion prediction model commensurate with the case where the vehicle travels in the oncoming traffic lane in the wrong direction is applied to the other vehicle PV, so that the range of existence A1 in which the other vehicle PV is predicted to exist after a predetermined time extends into the oncoming traffic lane. In this case, in order to secure safety of the host vehicle MV in relation with the other vehicle PV, a target course generated for the host vehicle MV is a target course in which the host vehicle MV advances little by little (decelerates) or a target course in which the host vehicle MV stops. If the host vehicle MV travels following the target course, it will become difficult for the host vehicle MV to move toward the destination even though the other vehicle PV keeps its lane. Besides, in FIG. 8B, in the case where the other vehicle PV is traveling in the wrong direction in the oncoming traffic lane, a motion prediction model commensurate with the case where the vehicle travels in the wrong direction in the oncoming traffic lane is applied to the other vehicle PV, so that the range of existence A2 in which the other vehicle PV is predicted to exist after a predetermined time extends into the oncoming traffic lane. In this case, too, the target course generated for the host vehicle MV is substantially the same as the target course described above. However, in this case, the generation of this target course is permissible or appropriate since the other vehicle PV is actually traveling in the wrong direction in the oncoming traffic lane.

In the case where the other vehicle PV is traveling keeping the cruising lane, there is no need to predict the motion of the other vehicle PV by assuming that the other vehicle PV travels in the wrong direction in the oncoming traffic lane, it is appropriate to predict the motion of the other vehicle PV on the assumption that the vehicle keeps the lane. Therefore, as shown in FIG. 8C, in the case where the other vehicle PV is traveling keeping the cruising lane (the case where the traffic rule "Do not run in the wrong direction." is complied with), a motion prediction model commensurate with the case where the vehicle keeps the lane ought to be applied to the other vehicle PV, so that the range of existence A3 of the other vehicle PV after a predetermined time will be limited within the cruising lane. In this case, the target course generated for the host vehicle MV is a target course in which the host vehicle MV advances greatly toward the destination, in order to secure safety of the host vehicle MV in relation with the other vehicle PV.

With reference to FIG. 5, an operation of the motion prediction apparatus 2 will be described using the flowchart shown in FIG. 9. The flowchart of FIG. 9 shows a flow or operation performed by the motion prediction apparatus 2 shown in FIG. 5.

The motion prediction apparatus 2 detects the state of travel of the host vehicle and performs the sensing for a nearby object (S20 and S21), and detects information about each nearby object from the information obtained by the sensing (S22), by operating substantially in the same manner as the motion prediction apparatus 1 in accordance with the first embodiment.

With regard to each nearby object, the motion prediction apparatus 2 determines the degrees of compliance of the nearby object with a plurality of traffic rules on the basis of the motion of the nearby object (S23). The motion prediction apparatus 2 sorts results of the determination of the degree of compliance regarding a plurality of traffic rules, according to the degrees of importance of the traffic rules (S24). Then, using the ranked-in-priority results of the determination of the degree of compliance of each nearby object with regard to the traffic rules, the motion prediction apparatus 2 finds a traffic rule with which the degree of compliance is low and which has the highest degree of importance among the traffic rules with which the degree of compliance is low. Then, according to that traffic rule, the motion prediction apparatus 2 selects an optimum motion prediction model for each nearby object (S25). Then, the motion prediction apparatus 2 predicts the motions of the nearby objects using the selected motion prediction models (S26).

Then, the motion prediction apparatus 2 outputs results of the prediction of the motion of each nearby object to various driving-assist apparatus or an automatic driving apparatus.

According to this motion prediction apparatus 2, by predicting the motion of a nearby object (mobile body) using an optimum motion prediction model commensurate with results of the determination of the degree of compliance of the nearby object with a plurality of traffic rules, it is possible to predict an appropriate movement region with regard to each mobile body even in an environment in which normal mobile bodies and abnormal mobile bodies mingle. In particular, according to the motion prediction apparatus 2, a motion prediction model optimum to a nearby object can be efficiently selected by fixing an order of priority of results of the determination of the degree of compliance of a plurality of traffic rules according to the degree of importance, and sequentially selecting a motion prediction model.

Figure 10:
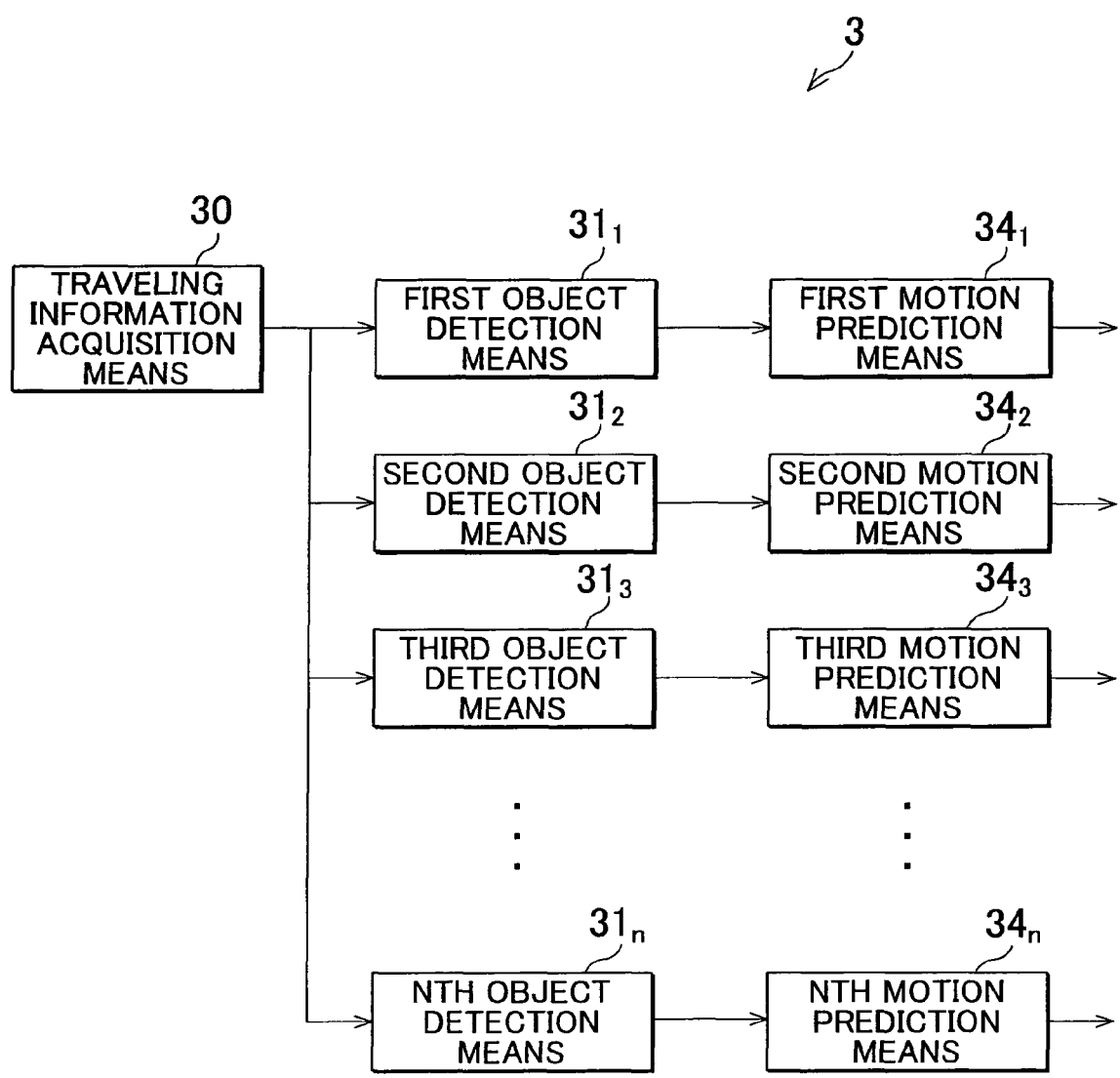
FIG. 10 is a construction diagram of a motion prediction apparatus in accordance with a third embodiment of the invention.
Figure 11A:
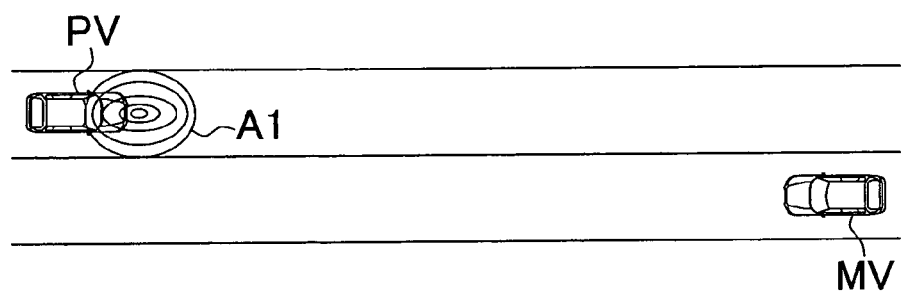
FIGS. 11A, 11B, 11C and 11D show examples of results of the motion prediction performed using various motion prediction models, and respectively show results of the motion prediction by a motion prediction model in which the prediction time is one second and the manipulation probability is uniformly distributed, results of the motion prediction by a motion prediction model in which the prediction time is one second and the vehicles are assumed to keep the lanes, results of the motion prediction by a motion prediction model in which the prediction time is five seconds and the manipulation probability is uniformly distributed, and results of the motion prediction by a motion prediction model in which the prediction time is five seconds and the vehicles are assumed to keep the lanes.
Figure 11B:
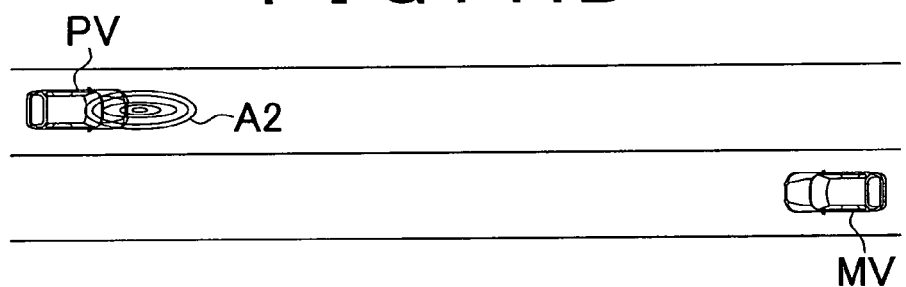
Figure 11C:
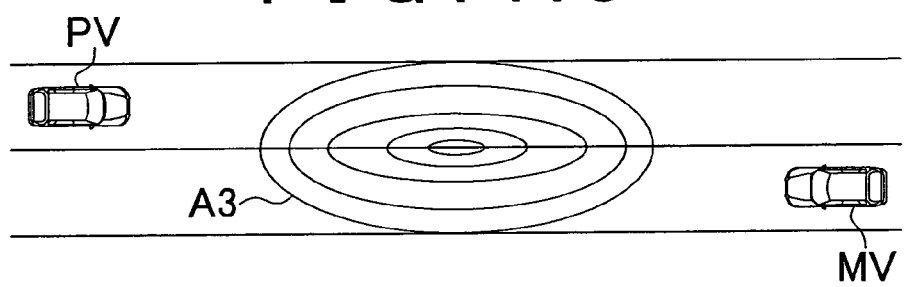
Figure 11D:
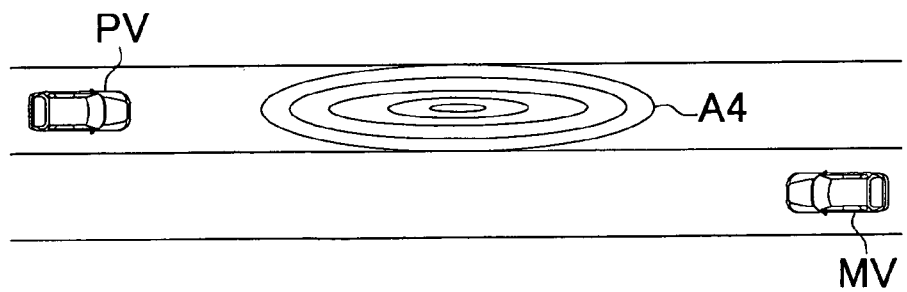

With reference to FIG. 10 and FIGS. 11A to 11D, a motion prediction apparatus 3 in accordance with a third embodiment will be described. FIG. 10 is a construction diagram for a motion prediction apparatus in accordance with a third embodiment. FIGS. 11A to 11D show examples of results of the motion prediction performed using various motion prediction models, and respectively show results of the motion prediction by a motion prediction model in which the prediction time is one second and the manipulation probability is uniformly distributed, results of the motion prediction by a motion prediction model in which the prediction time is one second and the vehicles are assumed to keep the lanes, results of the motion prediction by a motion prediction model in which the prediction time is five seconds and the manipulation probability is uniformly distributed, and results of the motion prediction by a motion prediction model in which the prediction time is five seconds and the vehicles are assumed to keep the lanes.

The motion prediction apparatus 3, with regard to each object around or near the host vehicle, predicts the motion of the nearby object on the basis of a plurality of motion prediction models. In particular, the motion prediction apparatus 3 performs parallel predictions of the motion of each nearby object using a plurality of motion prediction models in which a prediction time different from that set in another motion prediction model is set and a motion of the nearby object is predicted in accordance with the set prediction time. To that end, the motion prediction apparatus 3 includes, for example, traveling information acquisition means 30, first object detection means $31_1$, second object detection means $31_2$, third object detection means $31_3$, . . . and nth object detection means $31_n$, and also includes first motion prediction means $34_1$, second motion prediction means $34_2$, third motion prediction means $34_3$, . . . and nth motion prediction means $34_n$, as shown in FIG. 10. The first object detection means $31_1$, . . . and the nth object detection means $31_n$, and the first motion prediction means $34_1$, . . . and the nth motion prediction means $34_n$ are constructed in an ECU that is made up of a CPU, a ROM, a RAM, etc. Incidentally, the traveling information acquisition means 30 is substantially the same as the traveling information acquisition means 10 in the first embodiment, and the description thereof is omitted below.

Incidentally, in the third embodiment, the traveling information acquisition means 30, and the first object detection means $31_1$, . . . and the nth object detection means $31_n$ can be regarded as a mobile body detection device, and the first motion prediction means $34_1$, . . . and the nth motion prediction means $34_n$ can be regarded as a prediction device, and the motion prediction models that are prepared beforehand in each of the first motion prediction means $34_1$, . . . and the nth motion prediction means $34_n$ can be regarded as movement prediction models.

Each of the first object detection means $31_1$, . . . and the nth object detection means $31_n$ detects an object around or near the host vehicle on the basis of the information obtained through the sensing of the nearby object by the traveling information acquisition means 30, in substantially the same manner as the object detection means 11 in the first embodiment. In particular, while the first object detection means $31_1$, . . . and the nth object detection means $31_n$ detect the same nearby objects, and calculate pieces of information about the nearby objects that are needed in the first to nth motion prediction models that are prepared in the first to nth motion prediction means $34_1$ to $34_n$, respectively. Incidentally, it is also permissible to construct only one unit of object detection means 31 that calculates all the pieces of information about the nearby objects that are needed in the first to nth motion prediction models that are prepared in the first to nth motion prediction means $34_1$ to $34_n$, respectively.

With regard to each nearby object detected by the object detection means 31, each of the first motion prediction means $34_1$, . . . and the nth motion prediction means $34_n$ predicts a motion of the nearby object using the motion prediction model prepared by the means $34_1$ to $34_n$ itself. That is, with regard to each nearby object, the first motion prediction means $34_1$, . . . and the nth motion prediction means $34_n$ perform parallel predictions using different motion prediction models. Concretely, with regard to each nearby object, for example, the first motion prediction means $34_1$ inputs the information about the nearby object calculated by the first object detection means $31_1$, and outputs a range of existence in which the nearby object is predicted to exist after the shortest prediction time (and a probability of existence as well) through the use of the first motion prediction model. Besides, the nth motion prediction means $34_n$, with regard to each nearby object, inputs the information about the nearby object calculated by the nth object detection means $31_n$, and outputs a range of existence in which the nearby object is predicted to exist after the longest prediction time (and a probability of existence as well) through the use of the nth motion prediction model.

Thus, a plurality of motion prediction models that differ in the prediction time are prepared. As for the motion prediction models, the shorter the prediction time, the higher the reliability and the smaller the predicted range of existence. Therefore, in order to heighten safety in the relation between nearby objects and the host vehicle, it is necessary to certainly avoid the predicted ranges of existence whose prediction times are relatively short (which are predicted to occur relatively near in the future).

In order to certainly avoid the range of existence of a nearby object predicted to occur near in the future which has less uncertainty in prediction results than the motion of the nearby object predicted to occur far in the future, it is necessary to evaluate the safety of a plurality of prediction results based on different prediction times in a sequence such that prediction results based on shorter prediction times are more precedently subjected to the evaluation.

For example, when an optimum course of the host vehicle is to be selected, the safety of each of a plurality of candidate courses for the host vehicle with respect to the prediction results based on the shortest prediction time is evaluated, and then only one or more candidate courses that secure a safety are selected as one or more optimum candidate courses. In the case where a plurality of optimum candidate courses are selected, the safety of each of the selected optimum candidate courses with respect to the prediction results based on the next shortest prediction time is evaluated, and using the safety evaluations, optimum candidate courses that secure a safety are further narrowed. This process of evaluation and narrowing is repeatedly performed until the number of optimum candidate courses becomes sufficiently small or until the safety evaluation in conjunction with the longest prediction time is finished. Therefore, it becomes possible to more preferentially avoid the range of existence of a nearby object that is predicted to occur near in the future than the motion of the nearby object that is predicted to occur far in the future.

Incidentally, the means for more preferentially avoiding the range of existence of a nearby object that is predicted to occur near in the future than the motion of the nearby object that is predicted to occur far in the future is not limited to the method of evaluating the safety of the prediction results stating first with prediction results based on shorter prediction times. For example, it is also permissible to weight a prediction result more highly the shorter the prediction time of the prediction result is, and to simultaneously evaluate the safety of all the prediction results of different prediction times.

Besides, it is not altogether necessary to apply the same prediction model in conjunction with all the prediction times, but it is also permissible to prepare a plurality of prediction models in appropriate prediction methods for different prediction times. For example, in the case of a common driver who observes traffic rules (a driver whose degree of normality is high), there is possibility of instantaneously perform excessive manipulation (e.g., when avoiding an obstacle, when manipulating an audio device, etc.), but it is very rare to continue such an excessive manipulation for a long time. Hence, it is preferable in view of achieving both safety and travel efficiency to utilize motion prediction models in which excessive manipulations are assumed for the near future, and utilize motion prediction models for the far future in which the range of existence is limited. Incidentally, the limited motion prediction model can be realized adding a precondition that a nearby object observes traffic rules.

That is, in the case where a nearby object that is normal in the situation of movement is subjected to the prediction through the use of a prediction model prepared for a normal mobile body, the range of existence of the object is limited to a certain degree even if the prediction time is long; therefore, even in the case where the prediction time is long, the prediction results are reliable, and safety between the mobile body and the host vehicle can be secured. On the other hand, in the case where a nearby object that is abnormal in the situation of movement is subjected to the prediction through the use of a prediction model prepared for a normal mobile body, since the range of existence expands to larger ranges as the prediction time is increased; therefore, if the prediction time is long, the prediction results are not reliable, and the safety between the mobile body and the host vehicle cannot be secured. However, even in the case where the prediction is performed through the use of a motion prediction model prepared for an abnormal mobile body, if the prediction time is short, the range of existence is limited, so that the prediction results are reliable and therefore the safety between the nearby object and the host vehicle can be secured.

Hence, even in the case where the prediction is performed with regard to a nearby object that is normal in the situation of movement, the prediction with a short prediction time is performed using a motion prediction model prepared for a mobile body that is abnormal in the situation of movement, so that it becomes possible to cope with the case where the nearby object suddenly receives a abnormal manipulation or the like without losing the reliability of the prediction results. Thus, safety can be further improved. Besides, in the case of the prediction in conjunction with a long prediction time, necessary prediction can be performed by performing the prediction through the use of a motion prediction model prepared for a mobile body that is normal in the situation of movement. Hence, in the case where the motion prediction of a nearby object that is normal in the situation of movement is performed parallelly in a plurality of motion prediction models, the prediction in conjunction with short prediction times are performed using motion prediction models prepared for a mobile body that is abnormal in the situation of movement, and the prediction in conjunction with long prediction times are performed using motion prediction models prepared for a mobile body that is normal in the situation of movement, so that safety and travel efficiency can both be achieved.

FIGS. 11A to 11D show a case where while a host vehicle MV is traveling, one other vehicle PV is coming from ahead of the host vehicle MV in the on-coming traffic lane. In the example shown in FIG. 11a, a range of existence A1 of one another vehicle PV occurring after one second is predicted using a motion prediction model in which the manipulation probability is uniformly distributed (i.e., in which the driver of the vehicle is unpredictable in behavior). In the case where this motion prediction model is used, since the predicted range of existence is a range to which the vehicle can physically move in one second, the range A1 extending to the full width of the cruising lane of the other vehicle PV although the predicted range is a range that is predicted to occur merely after one second. In the example shown in FIG. 11B, a range of existence A2 of the other vehicle PV occurring after one second is predicted using a motion prediction model in which the vehicle is assumed to keep the lane. In the case where this motion prediction model is used, since the vehicle does not depart from the lane, the range A2 limited within the cruising range of the other vehicle PV is predicted. In the example shown in FIG. 11C, a range of existence A3 of the other vehicle PV occurring after five seconds is predicted using a motion prediction model a motion prediction model in which the manipulation probability is uniformly distributed. In the case where this motion prediction model is used, since the predicted range is a range to which the vehicle can physically move in five seconds, the range A3 extending into the oncoming traffic lane (i.e., the cruising lane of the host vehicle MV) is predicted. In the example shown in FIG. 11D, a range of existence A4 of the other vehicle PV occurring after five seconds is predicted using a motion prediction model in which the vehicle is assumed to keep the lane. In the case where this motion prediction model is used, since the vehicle does not depart from the lane, the range A4 limited within the cruising lane of the other vehicle PV is predicted although the range is predicted to occur after five seconds. In this example, in order to achieve both safety and travel efficiency, results of the prediction at 1 second in the future obtained through the use of the prediction model in which the manipulation probability is uniformly distributed (FIG. 11A) and results of the prediction at 5 seconds in the future obtained through the use of the prediction model in which the vehicle is assumed to keep the lane (FIG. 11D) are utilized.

In particular, the shorter the prediction time of a prediction result, the higher the reliability of the prediction result. Besides, the shorter the prediction time of a prediction result (i.e., the nearer in the future a motion of one other vehicle is predicted to occur), the more certainly the safety with the motion needs to be secured. Therefore, in the case where a plurality of prediction results with different prediction times are to be evaluated, it is appropriate to evaluate the prediction results in the order of increasing lengths of the prediction times of the prediction results.

With reference to FIG. 10, an operation of the motion prediction apparatus 3 will be described using the flowchart shown in FIG. 12. The flowchart in FIG. 12 shows a flow of operation performed by the motion prediction apparatus 3 shown in FIG. 10.

The motion prediction apparatus 3 detects the state of travel of the host vehicle and performs the sensing for a nearby object (S30 and S31), by operating substantially in the same manner as the motion prediction apparatus 1 in accordance with the first embodiment. Then, the motion prediction apparatus 3, on the basis of the information obtained by the sensing, detects pieces of information about each nearby object which correspond to first to nth motion prediction models, separately for each nearby object (S32$_1$ to S32$_n$).

With regard to each nearby object, the motion prediction apparatus 3 predicts a motion of the nearby object using each of the first to nth motion prediction models that differ in the prediction time (S33$_1$ to S33$_n$).

Then, the motion prediction apparatus 3 outputs a plurality of results of the prediction of motion of each nearby object to various driving-assist apparatuses or an automatic driving apparatus. On the side of an apparatus that inputs the foregoing results of the motion prediction, a plurality of prediction results with different prediction times with regard to each nearby object are input at every predetermined period. Then, on the apparatus side, the prediction results are sequentially evaluated in the order of increasing prediction times of the prediction results, and the generation of a target locus of the host vehicle, as for example, is performed.

According to this motion prediction apparatus 3, since the motion predictions are parallelly performed using a plurality of motion prediction models based on different prediction times, it is possible to perform motion prediction on the basis of appropriate prediction times corresponding to the situations of movement of various mobile bodies, and it is possible to predict a movement region with regard to each mobile body even in an environment in which normal mobile bodies and abnormal mobile bodies mingle.

With reference to FIG. 13, the motion prediction combining the switching of motion prediction models commensurate with results of the determination of the degree of compliance with the prioritized traffic rules in the second embodiment (a sequential process) and the parallel predictions using prediction models of different prediction times in the third embodiment will be described. FIG. 13 is a table showing an example of the method of selecting motion prediction models in the case where the sequential process and parallel predictions are combined.

In this example, the prediction times are 1 second, 5 seconds and 10 seconds. For each of these prediction times, a plurality of motion prediction models are prepared. In this example, the plurality of traffic models are the six rules presented above as examples in conjunction with the second embodiment.

Two motion prediction models whose prediction time is 1 second are prepared in this example. The two motion prediction models are a motion prediction model commensurate with the case where a vehicle does not stay in the friction circle, and a motion prediction model commensurate with the case where a vehicle stays in the friction circle. These two motion prediction models are constructed, for example, by uniformly distributing the manipulation probability.

As the motion prediction models whose prediction time is 5 seconds, the six models described above in conjunction with the second embodiment are prepared in this example. The motion prediction model commensurate with the case where the second highest-priority rule "Remain in the friction circle." and the rules subsequent thereto in priority are violated is constructed, for example, by uniformly distributing the manipulation probability. The other five motion prediction models are constructed by distributing the manipulation probability in an arbitrary manner. Examples of the arbitrary distribution include a uniform distribution, a standard distribution, a mixed standard distribution, a non-parametric distribution, etc.

As motion prediction models whose prediction time is 10 seconds, three models are prepared in this example. The three motion prediction models prepared in this example are a motion prediction model commensurate with the case where the traffic rule "Avoid rear-end collision." and the rules subsequent thereto in priority are violated, a motion prediction model commensurate with the case where the traffic rule "Respect priority.", which is the lowest in priority of the six rules, is violated, and a motion prediction model commensurate with the case where all the six traffic rules are observed are prepared. The three motion prediction models are constructed, for example, using combining behavior elements of a vehicle, such as travel straight, right and left turns, lane changes, etc.

With regard to each nearby object, one of the plurality of motion prediction models of each of the prediction times is selected according to results of the determination of the degree of compliance with the traffic rules, and the motion of the nearby object is predicted parallelly using the selected motion prediction models of the different prediction times. Thus, by performing the motion prediction parallelly using optimum motion prediction models commensurate with results of the determination of the degree of compliance with the prioritized traffic rules with respect to each of the prediction times, it is possible to achieve the effects of the second embodiment and the effects of the third embodiment.

While embodiments of the invention have been described above, the invention is not limited to the foregoing embodiments, but can be embodied in various forms.

For example, although in the embodiments, the invention is applied to a motion prediction apparatus, the invention may also be applied to other apparatuses, such as various driving-assist apparatuses (a collision prevention apparatus, and the like), an automatic driving apparatus, and the like which need results of the prediction of the motion of a mobile body.

Besides, although in the foregoing embodiments, the sensing of nearby objects is performed using sensors that are mounted in the host vehicle, it is also permissible to adopt a construction in which information about nearby objects is acquired by vehicle-to-vehicle communication, road-to-vehicle communication, etc. In this case, it is also possible to adopt a construction in which the state of the driver of a nearby object is detected using sensors that are attached to the nearby object or to a road infrastructure, and the detected state of the driver or the degree of normality of the driver found from the detected state of the driver is distributed to the host vehicle by the vehicle-to-vehicle communication or the road-to-vehicle communication. As the degree of normality, the state of the driver of one other vehicle (an awake state, a drunk state, a mental state, etc.)

Besides, although in the first embodiment, the plurality of motion prediction models prepared individually for the degrees of normality, it is also permissible to adopt a construction in which one motion prediction model that has degrees of normality as parameters is prepared, and a motion prediction mode in which an estimated degree of normality is taken as a value of a parameter is set. For example, in the case of a motion prediction model which has as a parameter the acceleration/deceleration that is permitted in the travel of a mobile body, the acceleration/deceleration of a nearby mobile body is estimated, and a motion prediction model in which the estimated value of the acceleration/deceleration is taken as a value of a parameter is set. Besides, it is also permissible to adopt a construction in which one motion prediction model that has a prediction parameter is prepared, and the value of the parameter is determined on the basis of an estimated degree of normality, and a motion prediction model based on the determined value of the parameter is set. For example, in the case of a motion prediction model which has as a parameter the acceleration/deceleration that is permitted in the travel of a mobile body, the value of acceleration/deceleration of a nearby mobile body is determined on the basis of the degree of normality of the nearby mobile body, and a motion prediction model in which the determined value of the acceleration/deceleration is taken as a value of the parameter is set.

Besides, although in the second embodiment, results of the determination of the degree of compliance with a plurality of prioritized traffic rules as a situation of compliance with traffic rules are evaluated in a sequential manner, the situation of compliance with traffic rules may be other than this. For example, the degree of compliance may be set at a plurality of steps on the basis of results of the compliance/violation of a plurality of traffic rules. Besides, it is also permissible to adopt a construction in which the degrees of compliance of traffic rules are determined in the descending order of importance of the traffic rules, and in which at the time point when a traffic rule with which the degree of compliance is low is determined, a motion prediction model is selected according to the determined traffic rule.

Besides, although the third embodiment has a construction in which a plurality of results of the prediction produced in a plurality of motion prediction models are output to a downstream-side apparatus, it is also permissible to integrate a plurality of results of the prediction into one result in which a parameter of time is factored in.

Besides, although the third embodiment has a construction in which the prediction is performed parallelly in a plurality of motion prediction models of different prediction times and results of the prediction are evaluated, it is also permissible to adopt a construction in which a motion prediction model in which the prediction time is variably set is employed, and the prediction is performed in the motion prediction model while the prediction time is varied, and the thus-obtained results of the prediction are evaluated. In this case, the prediction may also be performed by determining a prediction time on the basis of the degree of normality, and changing the prediction time of the motion prediction time to the thus-determined prediction time.

As a method of estimating the degree of normality without depending on traffic rules, a residual of a linear prediction may also be utilized for the prediction, besides the degree of weaving. The residual is found, for example, as in Expression (1). In Expression (1), k is a degree or order that is determined beforehand.

$$\delta X(t) = \left| X(t-1) - \sum_{n=1}^{k} \alpha(n) X(t-n) \right| \quad (1)$$

There also is a method based on the magnitude of residual. In this case, if the residual is large, that is, if the residual error is large, it suffices to determine that the degree of normality is low. Besides, it is also possible to use the residual itself as a parameter of how the prediction model expands. Incidentally, it suffices that the method of estimating the degree of normality is capable of evaluating the difficult of prediction, and it is to be understood that the method of estimating the degree of normality is not limited to the foregoing methods.

The invention claimed is:

1. A movement region prediction apparatus comprising:
    a mobile body detection device that detects a mobile body around a host vehicle;
    a prediction device that predicts a movement region of the detected mobile body after a prediction time,
    wherein the prediction device has a plurality of movement prediction models that have different prediction times for predicting the movement region of the mobile body, and performs prediction using the plurality of movement prediction models to predict the movement region of the mobile body; and
    a degree of normality acquisition device that acquires a degree of normality of a situation of movement of the detected mobile body,
    wherein the prediction device selects a movement prediction model from the plurality of movement prediction models based on the acquired degree of normality, and predicts the movement region of the mobile body using the selected movement prediction model,
    wherein, in the case where the movement prediction of the mobile body around the host vehicle that is normal in the situation of movement is performed, the prediction in conjunction with short prediction times are performed using movement prediction models prepared for a mobile body that is abnormal in the situation of movement, and the prediction in conjunction with long prediction times are performed using movement prediction models prepared for a mobile body that is normal in the situation of movement, and wherein the movement prediction model prepared for the mobile body that is normal in the situation of movement predicts a smaller range of existence in which the movable body is to exist after a predetermined time, as compared with the movement prediction model prepared for the mobile body that is abnormal in the situation of movement.

2. The movement region prediction apparatus according to claim 1, wherein
the degree of normality acquired by the degree of normality acquisition device is based on at least one of a degree of weaving of the mobile body, a degree of compliance of the mobile body with traffic rules, acceleration/deceleration of the mobile body, or risk of the mobile body colliding with another object.

3. The movement region prediction apparatus according to claim 2, wherein
the degree of normality is lower if at least one of the degree of weaving of the mobile body is higher, the degree of compliance of the mobile body with traffic rules is lower, acceleration/deceleration of the mobile body is higher, or the risk of the mobile body colliding with another object is higher.

\* \* \* \* \*